US008364948B2

United States Patent
Grebus et al.

(10) Patent No.: US 8,364,948 B2
(45) Date of Patent: Jan. 29, 2013

(54) SYSTEM AND METHOD FOR SUPPORTING SECURED COMMUNICATION BY AN ALIASED CLUSTER

(75) Inventors: Gary L. Grebus, Brookline, NH (US); Dan C. Vuong, Ayer, MA (US); Paul Moore, Bedford, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2807 days.

(21) Appl. No.: 11/013,197

(22) Filed: Dec. 15, 2004

(65) Prior Publication Data

US 2006/0002388 A1    Jan. 5, 2006

Related U.S. Application Data

(60) Provisional application No. 60/585,476, filed on Jul. 2, 2004.

(51) Int. Cl.
*H04L 29/06* (2006.01)

(52) U.S. Cl. .................................... 713/153; 726/26

(58) Field of Classification Search .................. 709/245, 709/238; 370/401, 389, 395; 713/165, 201, 713/168, 153; 726/11
See application file for complete search history.

(56) References Cited

U.S. PATENT DOCUMENTS

| | | | |
|---|---|---|---|
| 6,055,236 A | 4/2000 | Nessett et al. | |
| 6,195,705 B1 * | 2/2001 | Leung | 709/245 |
| 6,347,376 B1 | 2/2002 | Attwood et al. | |
| 6,487,605 B1 | 11/2002 | Leung | |
| 6,505,192 B1 | 1/2003 | Godwin et al. | |
| 6,539,483 B1 | 3/2003 | Harrison et al. | |
| 6,549,538 B1 * | 4/2003 | Beck et al. | 370/395.52 |
| 6,636,898 B1 | 10/2003 | Ludovici et al. | |
| 6,643,776 B1 | 11/2003 | Boden et al. | |
| 6,665,304 B2 | 12/2003 | Beck et al. | |
| 6,668,282 B1 | 12/2003 | Booth, III et al. | |
| 6,671,273 B1 * | 12/2003 | Beck | 370/389 |
| 6,779,039 B1 * | 8/2004 | Bommareddy et al. | 709/238 |
| 6,880,089 B1 * | 4/2005 | Bommareddy et al. | 726/11 |
| 7,028,183 B2 * | 4/2006 | Simon et al. | 713/168 |
| 7,055,173 B1 * | 5/2006 | Chaganty et al. | 726/11 |
| 2001/0014097 A1 * | 8/2001 | Beck et al. | 370/401 |
| 2001/0042204 A1 * | 11/2001 | Blaker et al. | 713/165 |
| 2002/0027884 A1 | 3/2002 | Halme | |
| 2002/0095603 A1 * | 7/2002 | Godwin et al. | 713/201 |
| 2002/0120760 A1 | 8/2002 | Kimchi et al. | |
| 2002/0133602 A1 * | 9/2002 | Godwin et al. | 709/229 |
| 2002/0133608 A1 | 9/2002 | Godwin et al. | |
| 2003/0093691 A1 * | 5/2003 | Simon et al. | 713/201 |
| 2006/0002388 A1 * | 1/2006 | Grebus et al. | 370/389 |

OTHER PUBLICATIONS

N Ferguson; A Cryptographic Evaluation of IPsec; Jan. 2000 ; Computer Security Inc.*
"How can high-availability be made easy for enterprise applications?" Compaq TruCluster Software [Online] Retrieved from www.compaw.com/tru64unix—8 pages.

(Continued)

*Primary Examiner* — Philip Chea
*Assistant Examiner* — Monjour Rahim

(57) ABSTRACT

Cluster aliasing is implemented for a cluster of a plurality of computer-based members. The aliased cluster supports secured communication with a non-member node. The cluster aliasing provides an appearance to the non-member node of a common network address for the plurality of members. In supporting the secured communication, a first of the plurality of members is assigned to process secure inbound data directed to the common network address from the non-member node, and a second, different of the plurality of members is assigned to send secure outbound data from the common network address to the non-member node.

56 Claims, 12 Drawing Sheets

OTHER PUBLICATIONS

IP Security Protocol (ipsec) [Online] Retrieved from http://www.ietf.org/html.charters/ipsec-charter.html Retrieved on Jan. 13, 2004—4 pages.

"IP Security Document Roadmap", [Online] Retrieved from http://www.ietf.org/rfc/rfc2411.txt Retrieved on Jan. 13, 2004—10 pages.

"IP Encapsulating Security Payloadd (ESP)" [Online] Retrieved from http://www.ietf.org/rfc/rfc2406.txt Retrieved on Jan. 13, 2004—20 pages.

The Internet Key Exchange (IKE) [Online] Retrieved from http://www.ietf.org/rfc/rfc2409.txt Retrieved on Jan. 13, 2004—38 pages.

"Security Architecture for the Internet Protocol" [Online] Retrieved from http://www.ietf.org/rfc/rfc2401.txt retrieved on Jan. 13, 2004—60 pages.

U.S. Appl. No. 60/585,476, filed Jul. 2, 2004, Grebus et al.

"TruCluster Server—Cluster Highly Available Applications" Hewlett-Packard Company Part Number: AA-RHHOE-TE, Sep. 2002—194 pages.

"IPsec Support for TruCluster Cluster Alias", Architecture Document, Version 1.0 Hewlett-Packard Company Tru64 UNIX BOSnet Engineering, Sep. 15, 2003, 87 pages.

* cited by examiner

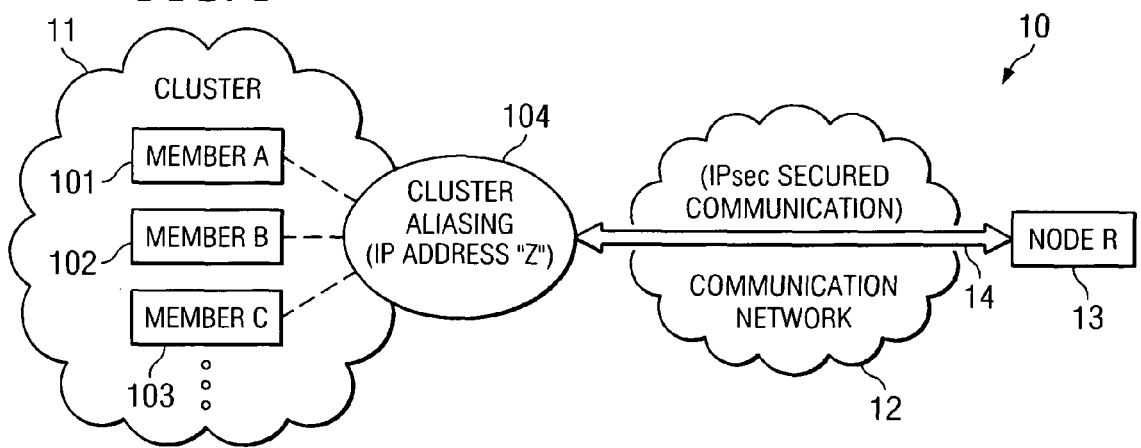
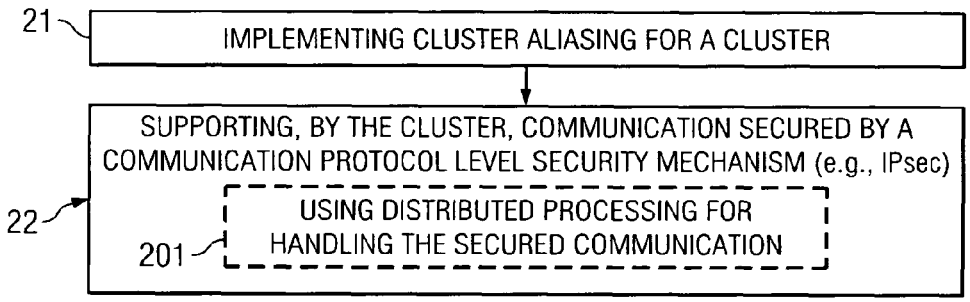
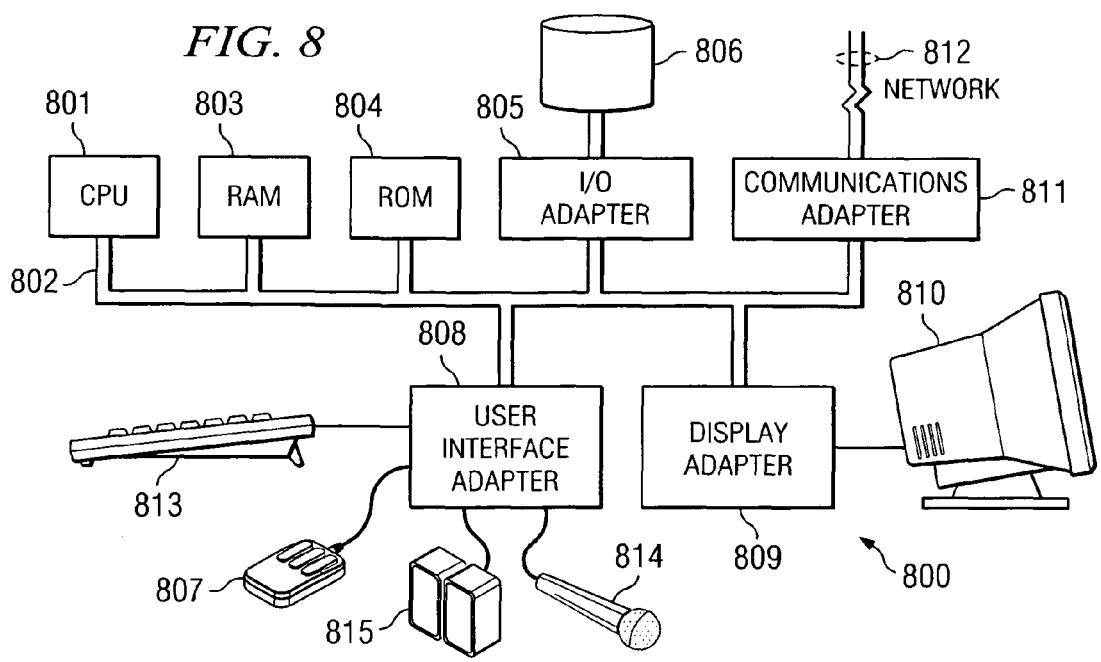

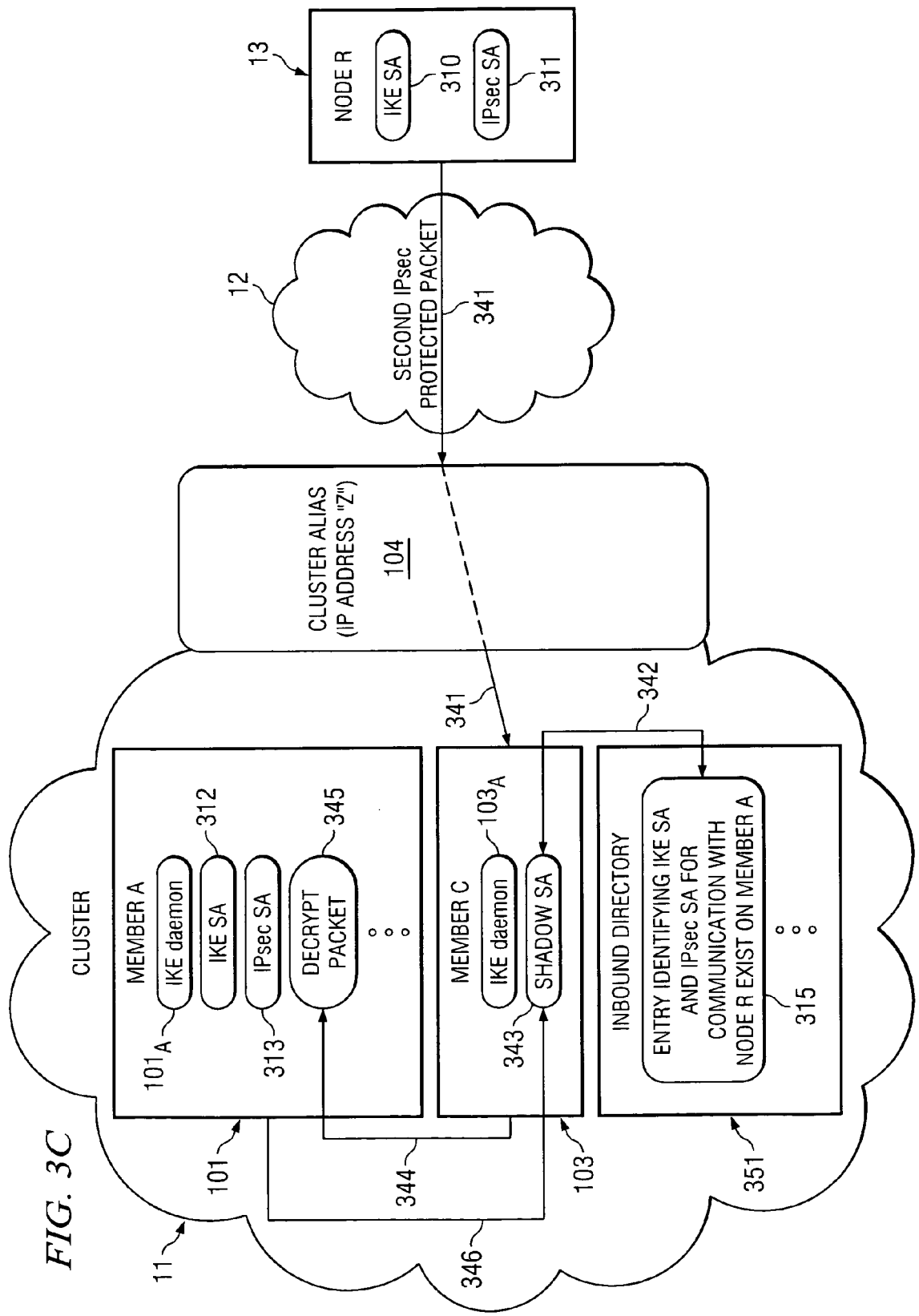

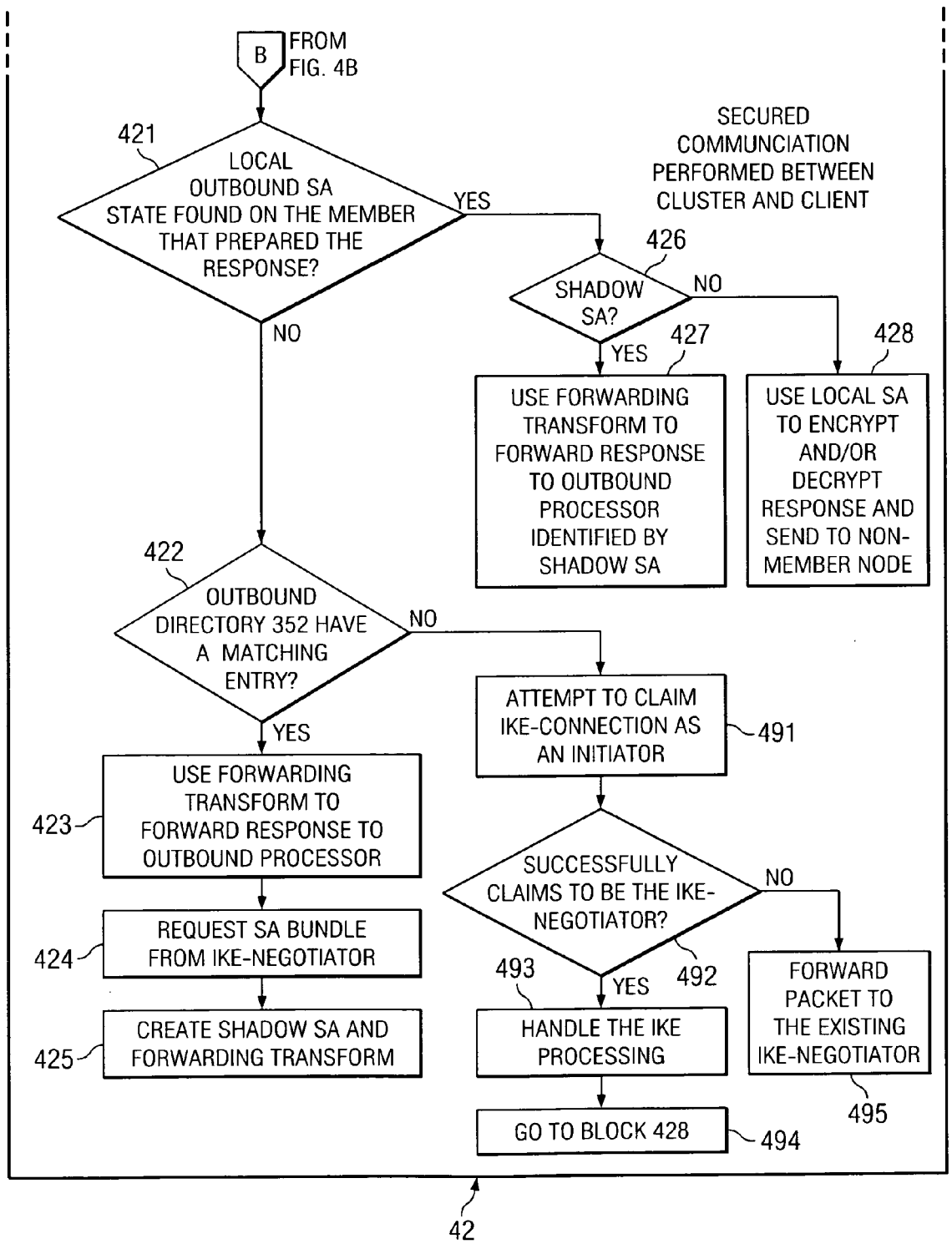

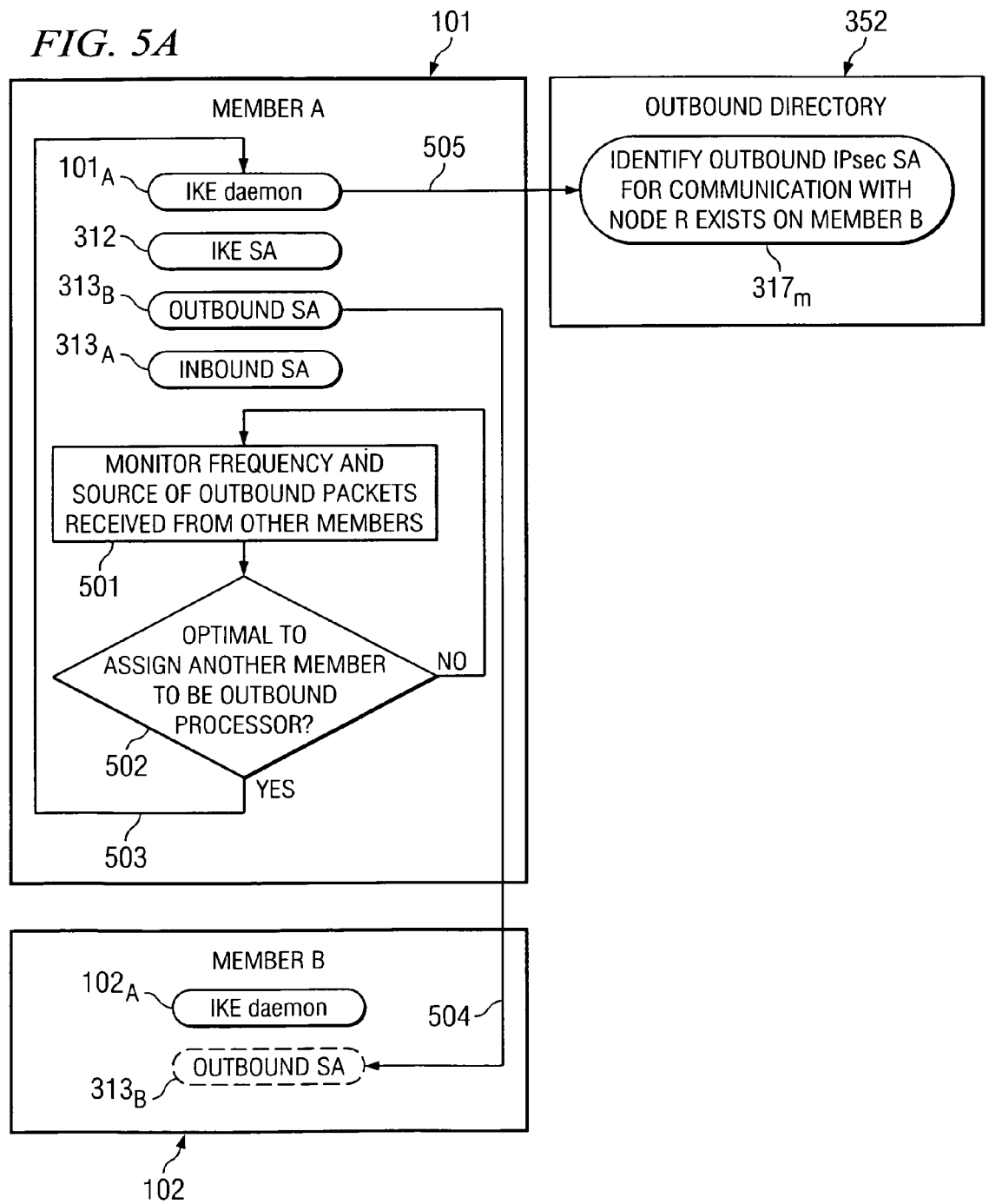

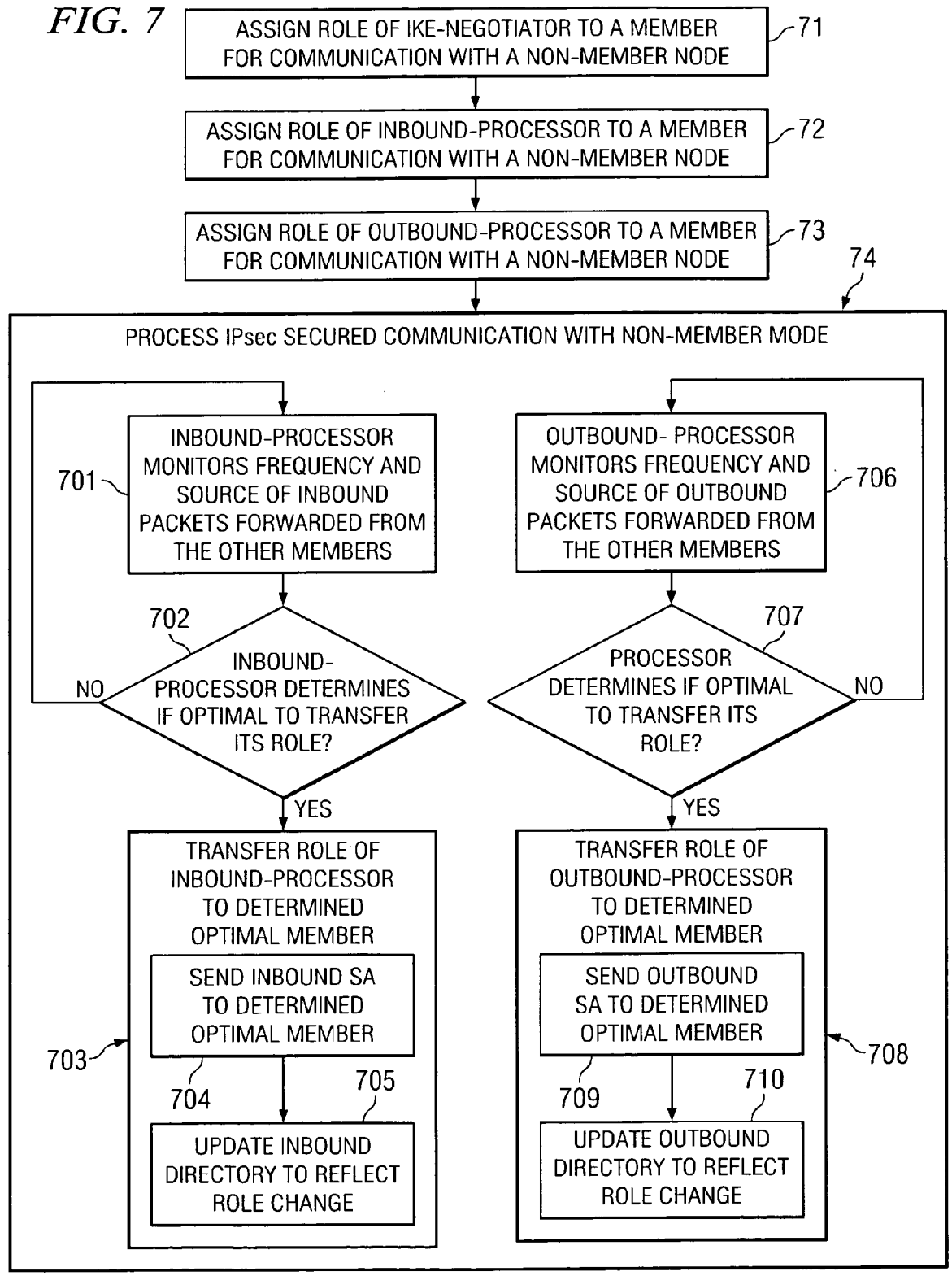

SYSTEM AND METHOD FOR SUPPORTING SECURED COMMUNICATION BY AN ALIASED CLUSTER

RELATED APPLICATIONS

This application claims priority to U.S. Provisional Patent Application Ser. No. 60/585,476 entitled "SYSTEM AND METHOD FOR SUPPORTING SECURED COMMUNICATION BY AN ALIASED CLUSTER", filed Jul. 2, 2004, the disclosure of which is hereby incorporated herein by reference.

BACKGROUND

In general, a cluster is a group of processor-based nodes (e.g., servers and/or other resources) that act like a single system. That is, clustering generally refers to communicatively connecting two or more computers together in such a way that they behave like a single computer. Clustering is used for parallel processing, load balancing, and/or fault tolerance (or "high availability"), as examples. Each node of a cluster may be referred to as a "member" of that cluster.

DESCRIPTION OF RELATED ART

Clustering may be implemented, for example, using the TruCluster™ Server product available from Hewlett-Packard Company. Such TruCluster Server is described further in the manual for the TruCluster Server Version 5.1B dated September 2002 and titled "TruCluster Server: Cluster Highly Available Applications." That manual describes generally how to make applications highly available on a Tru64 UNIX TruCluster Server Version 5.1B cluster and describes generally the application programming interface (API) libraries of the TruCluster Server product.

Because of the sensitivity of much of the information communicated over computer networks, various security mechanisms have been developed for use in authenticating the sender and recipient of information and ensuring that the information is not readable by any unintended recipients. For instance, communication protocol level security mechanisms, such as "IPsec" for the Internet Protocol ("IP") communication protocol, have been developed. IPsec, short for IP security, is a set of protocols developed by the Internet Engineering Task Force (IETF) to support secure exchange of packets at the IP layer. IPsec has been deployed widely to implement Virtual Private Networks (VPNs). In general, IPsec offers IP-based encryption and packet level authentication.

In view of the above, IPsec is a protocol-level security mechanism that may be used to provide host and network level protection such as authenticating the remote host or gateway and protecting the traffic in route. Communication protocol level security, such as IPsec, has traditionally not been used for communication with a cluster that uses cluster aliasing due at least in part to conflicts between their respective operations. Accordingly, a desire exists for enabling secured communication with a cluster that uses cluster aliasing.

SUMMARY

According to at least one embodiment, a method comprises implementing cluster aliasing for a cluster of a plurality of members. The method further comprises supporting, by the aliased cluster, secured communication with a non-member node.

According to at least one embodiment, a system comprises an aliased cluster having a plurality of processor-based devices as members. The aliased cluster supports communication protocol level secured communication with a non-member node.

According to at least one embodiment, a clustered computer system comprises means for performing cluster aliasing to provide an appearance of a common network address for a plurality of members of the cluster. The clustered computer system further comprises means for supporting IPsec secured communication between the aliased cluster and a node that is not a member of the cluster.

According to at least one embodiment, a method of supporting IPsec secured communication by an aliased cluster is provided. The method comprises assigning, for a given IPsec secured communication session with a node that is not a member of the cluster, a role of Inbound-Processor to a member of the aliased cluster, and assigning, for the given IPsec secured communication session, a role of Outbound-Processor to a member of the aliased cluster. The method further comprises publishing the identity of the member assigned the role of Inbound-Processor in a directory that is accessible by all members of the aliased cluster, and publishing the identity of the member assigned the role of Outbound-Processor in a directory that is accessible by all members of the aliased cluster.

BRIEF DESCRIPTION OF THE DRAWINGS

FIG. 1 shows an example system adapted in accordance with at least one embodiment for providing secured communication with a cluster that uses cluster aliasing;

FIG. 2 shows an operational flow diagram for at least one embodiment for providing secured communication with an aliased cluster;

FIGS. 3A-3C show an example embodiment for supporting IPsec secured communication by an aliased cluster under various scenarios;

FIGS. 4A-4C show an operational flow for a member of a cluster according to one embodiment, such as the example embodiment of FIGS. 3A-3C;

FIG. 5A shows an example of migrating the role of Outbound-Processor from one member of cluster to another member in accordance with one embodiment;

FIG. 7 shows an operational flow diagram for dynamically transferring roles for a given communication session between members of an aliased cluster in accordance with one embodiment; and FIG. 8 illustrates an example computer system adapted according to an embodiment for implementing a member of an aliased cluster that supports secured communication.

DETAILED DESCRIPTION

Figures 1, 3A:
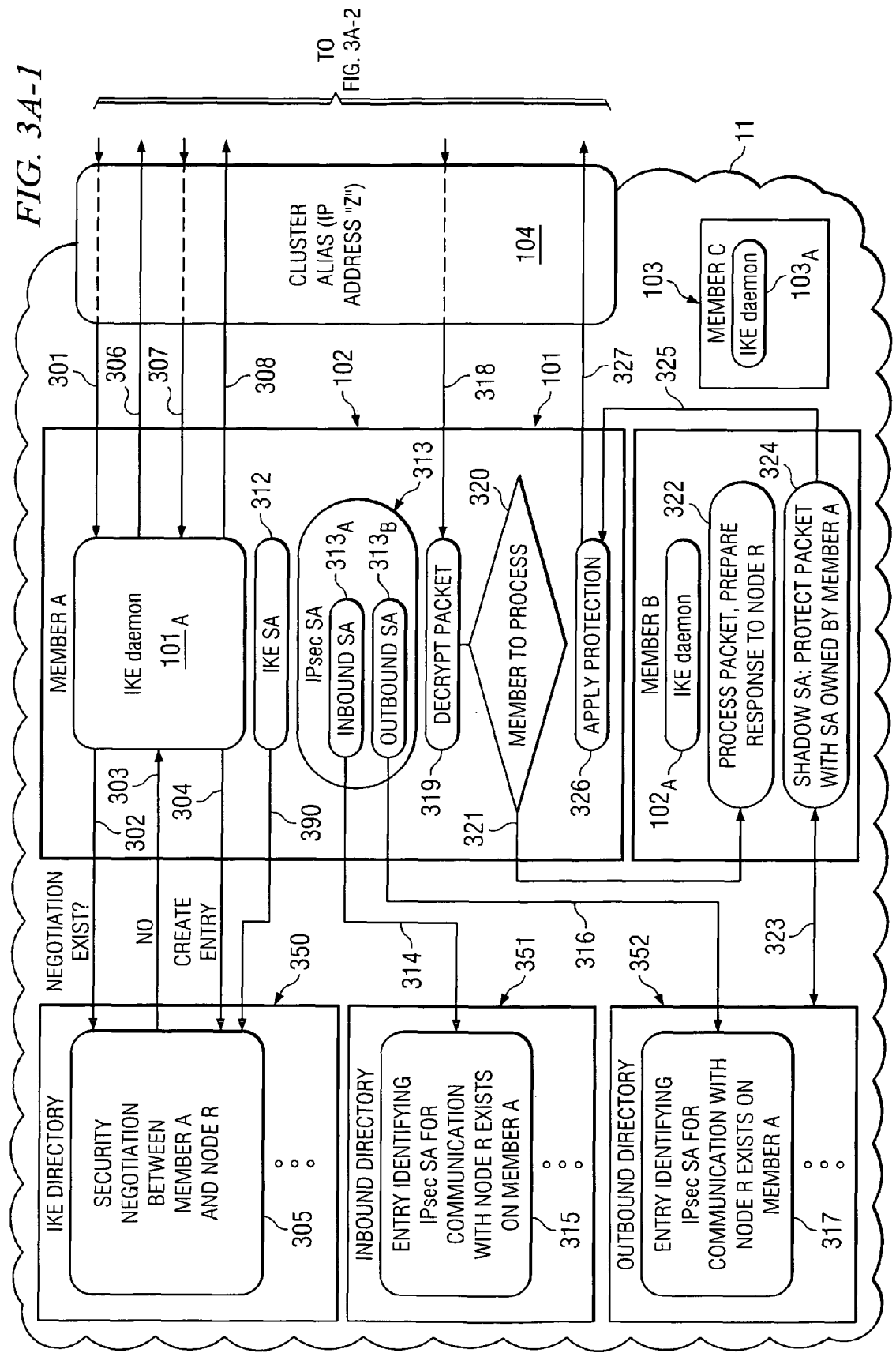

FIG. 1 shows an example system 10 adapted in accordance with at least one embodiment for providing secured communication with a cluster 11 that uses cluster aliasing. As shown, cluster 11 includes various members, such as Member A (labeled 101), Member B (labeled 102), and Member C (labeled 103), and cluster 11 uses cluster aliasing 104 to provide a common network address (e.g., IP address) for cluster Members 101-103. In this example, cluster aliasing 104 is used to provide a common IP address, address "Z," for cluster 11. Thus, cluster aliasing 104 creates the illusion that all (or a selected portion) of the members 101-103 share a single IP address "Z". As such, cluster 11 may be referred to herein as an "aliased cluster" in that cluster aliasing is implemented to provide the illusion of a common network address for all (or a selected portion) of its members. In certain implementations, each cluster member may have its own individual (unique) IP address and the cluster alias address for each cluster alias that it joins. For instance, Member A 101 may have an individual IP address "A", as well as cluster alias IP address "Z" for the cluster 11 that Member A has joined. Thus, a remote node may communicatively access Member A via its individual IP address "A", and a remote node may communicatively access cluster 11 (of which Member A is a member) via IP address "Z".

In general, a cluster alias is a network address (e.g., an IP address) that makes some or all of the systems (members) in the cluster look like a single system to non-member nodes, rather than individual systems. That is, rather than providing a separate network address for each member of the cluster, cluster aliasing provides a common network address for all (or a selected portion) of the members of the cluster. As an example, a cluster having X number of members may be implemented and various applications may be distributed among its members (e.g., a first application implemented on a first member, a second application implemented on a second member, and so on). Cluster aliasing may be used to provide a common IP address, address "Z," for the cluster, whereby non-member nodes can communicatively access any of the applications distributed among the cluster members via the cluster's IP address "Z". Thus, the cluster provides the appearance that the members form a single system on which the various applications are available, and cluster aliasing provides a single IP address for the apparent single system of the cluster. Thus, rather than each cluster member that interfaces to the network having a separate IP address, cluster aliasing creates the illusion that all (or a selected portion) of the members share a single IP address. Of course, in certain implementations members of a cluster may also have individual IP addresses. When accessing address "Z", unbeknownst to the remote node, the IP address "Z" actually accesses a cluster of nodes.

While shown as a separate element for ease of illustration in FIG. 1, cluster aliasing 104 may actually be a process distributed across members 101-103. For instance, generally the cluster aliasing mechanism is part of the kernel network stack of each cluster member. When a packet enters or leaves a node, the network stack decides if the packet is cluster-related, and if the packet is cluster-related, the network stack transfers the packet to a cluster alias stack where any special cluster alias operations are performed. Such techniques for implementing an aliased cluster are well-known (e.g., as described further in the manual for the TruCluster Server Version 5.1B dated September 2002 and titled "TruCluster Server: Cluster Highly Available Applications," see e.g. chapters 3 and 8 thereof), and are therefore not described in greater detail herein. Embodiments for supporting secured communication by an aliased cluster described further herein may be adapted for use with any aliasing technique now known or later developed, and are thus not limited in application to the aliasing technique of the TruCluster Server product.

One or more remote nodes (or "non-member nodes"), such as node R 13 in FIG. 1, are capable of communicatively accessing cluster 11 via communication network 12 by accessing IP address "Z". Node R 13 may, in certain situations, be referred to as a "client" (with cluster 11 acting as a server in a client-server type environment), or Node R 13 may be referred to as a "remote node" (or "non-member node") because it is a node (or "processor-based device" such as a personal computer (PC), workstation, personal data assistant (PDA), cellular telephone, etc.) that is not included in cluster 11 but is capable of at least temporarily communicatively coupling to cluster 11 via communication network 12. Unless distinguishing descriptive terms accompany either term, the terms "remote node" and "non-member node" are used interchangeably herein, and each refers to a processor-based device that is not included as a member of a cluster and is capable of at least temporarily communicatively communicating with such cluster. Further, such node (e.g., R 13) may itself be a cluster (i.e., a plurality of clustered nodes) in certain implementations. Accordingly, the reference herein to a remote or non-member node is not intended to be exclusively a single node, but is instead intended to also encompass a cluster of nodes (e.g., an aliased cluster of nodes) that effectively form a remote or non-member "node".

In this example embodiment of FIG. 1, node R 13 communicates with cluster 11 via secured communication 14. More specifically, in this example embodiment, secured communication 14 utilizes IPsec for securing the information communicated between node R 13 and cluster 11. Thus, this example embodiment provides for IPsec secured communication 14 with aliased cluster 11.

Communication network 12 may be, for example, the Internet or other Wide Area Network (WAN), a local area network (LAN), a wireless network, public (or private) switched telephony network (PSTN), any combination of the above, or any other communication network now known or later developed within the networking arts which permits two or more processor-based devices to communicate with each other. Preferably, communication network 12 is a packet-switched network that supports communication of information via a suitable protocol, such as IP. Cluster 11 may be implemented using the TruCluster Server product available from Hewlett-Packard Company, which provides for cluster aliasing 104. Of course, other clustering techniques and/or other techniques for providing cluster aliasing that provides the illusion to remote nodes that a common network address exists for all or a selected portion of the members of a cluster that are now known or later developed may be used for implementing cluster 11 and its cluster aliasing 104 in other embodiments. Also, while the IP protocol is used for communication between the remote node R 13 and cluster 11 in this example, which makes use of the IPsec security feature, other communication protocols and/or communication protocol level security mechanisms that are now known or later developed may be used in other embodiments for communication between Node R 13 and cluster 11.

Communication protocol level security, such as IPsec, has previously not been used for communication with a cluster that uses cluster aliasing due at least in part to conflicts between their respective operations. That is, applying both cluster aliasing and IPsec to the same network traffic has traditionally been avoided. Although cluster aliasing creates the appearance that multiple members have the same IP address, each network connection made using an alias address has its transport-layer endpoint on only one member. IPsec, operating at the IP layer, also creates a form of connection called a Security Association (SA). The SA represents the endpoint of the secured communication (e.g., the endpoint of the encryption and/or authentication). One difficulty with using IPsec with cluster aliasing is that multiple transport-layer connections may share the same SA, even though the SA and transport-layer connections might all exist on different members of the cluster. Certain embodiments described further herein accommodate these conflicting types of connections without introducing prohibitive processing overhead within the aliased cluster.

As an example of potential problems that may arise in using IPsec for secured communication with an aliased cluster not utilizing embodiments described herein, suppose that remote node R 13 establishes communication with alias IP address "Z", as shown in the example of FIG. 1. Remote node R 13 is unaware that the communication is with a cluster because the cluster aliasing 104 provides the illusion that node R 13 is communicating with a single system having a single interface to communication network 12 at IP address "Z". While cluster aliasing 104 provides a single IP address ("Z") for cluster 11, initial communication from node R 13 is received by one of members 101-103. Suppose, for example, such initial communication is received by Member A 101 and the initial security negotiation is performed between Member A 101 and node R 13. That is, the SA is established on Member A 101 (e.g., encryption keys for secured communication are exchanged between Member A 101 and node R 13, policies are negotiated and authentication is verified). Now suppose that once the security is negotiated, secured information is communicated using IPsec from node R 13 to IP address "Z", and this secured information is received by Member B 102. In this case, Member B 102 did not negotiate the authentication and encryption keys with remote node R 13 and is thus unable to authenticate and decrypt the received information. That is, Member B 102 does not possess the SA for communicating with node R 13.

As a further example, suppose that after the security is negotiated between Member A 101 and node R 13, secured information is communicated using IPsec from node R 13 to IP address "Z", and this secured information is received by Member A 101. Further suppose that Member A 101 authenticates and decrypts the information and determines that Member C 103 possesses the proper application for processing the information, and so Member A 101 passes the decrypted information to Member C 103 for processing, as is a common technique (e.g., for load balancing, etc.) in clusters. Member C 103 may then attempt to respond to node R 13, but because the security was not negotiated with Member C 103, Member C 103 does not possess the SA for securing the response. Accordingly, Member C 103 is unable to send the response secured to node R 13 because Member C 103 is unaware of the proper SA to be used for that communication.

The above issues are further exacerbated in that IPsec dynamically changes the encryption and authentication keys. That is, security negotiation continues to evolve to dynamically vary the keys during the communication session 14. Again, rather than addressing these and other issues involved with allowing IPsec secured communication with an aliased cluster, such use of IPsec secured communication with an aliased cluster has traditionally been avoided.

As described further below, embodiments are provided for enabling communication protocol level secured communication, such as IPsec, to be used in communicating with an aliased cluster. As further described below, certain embodiments maintain state information associated with the secured communication in a manner such that the state information is visible cluster-wide (e.g., to all members of the aliased cluster). For instance, in certain embodiments, Internet Key Exchange ("IKE SA") and IPsec SA information (including inbound and outbound IPsec SAs) are stored to databases such that they are visible (accessible) by all members of the aliased cluster.

As further described, certain embodiments provide a technique that enables distributed processing by the cluster for IPsec communication. Thus, rather than communication that is secured by IPsec being handled by a single node with which security is negotiated, such secured communication may be handled in certain embodiments through distributed processing by a plurality of different members of the cluster. Certain embodiments divide different roles associated with the secured communication and enable the different roles to be distributed among different members of the aliased cluster. For instance, in certain embodiments, roles of Security Negotiator (e.g., IKE-Negotiator), Inbound-Processor, and Outbound-Processor are utilized. The role of Security Negotiator (e.g., IKE-Negotiator) is assigned to the member responsible for negotiating security with the non-member node, which may be, as in IPsec, an ongoing process throughout a communication session with the non-member node (e.g., the encryption/decryption and authentication keys may dynamically change over time during the communication session). The role of Inbound-Processor is assigned to the member responsible for receiving and decrypting/authenticating secured inbound communication from the non-member node. The role of Outbound-Processor is assigned to the member responsible for encrypting and sending outbound communication to the non-member node. In certain embodiments, the assignment of these roles may dynamically change from member to member to support the communication protocol level security (e.g., IPsec) in an efficient manner. Additionally, the cluster maintains the illusion to a non-member node that the aliased cluster has a single IP address, although various different members of the cluster may be used in handling of the IPsec communication in a distributed manner.

Figures 2, 3A:
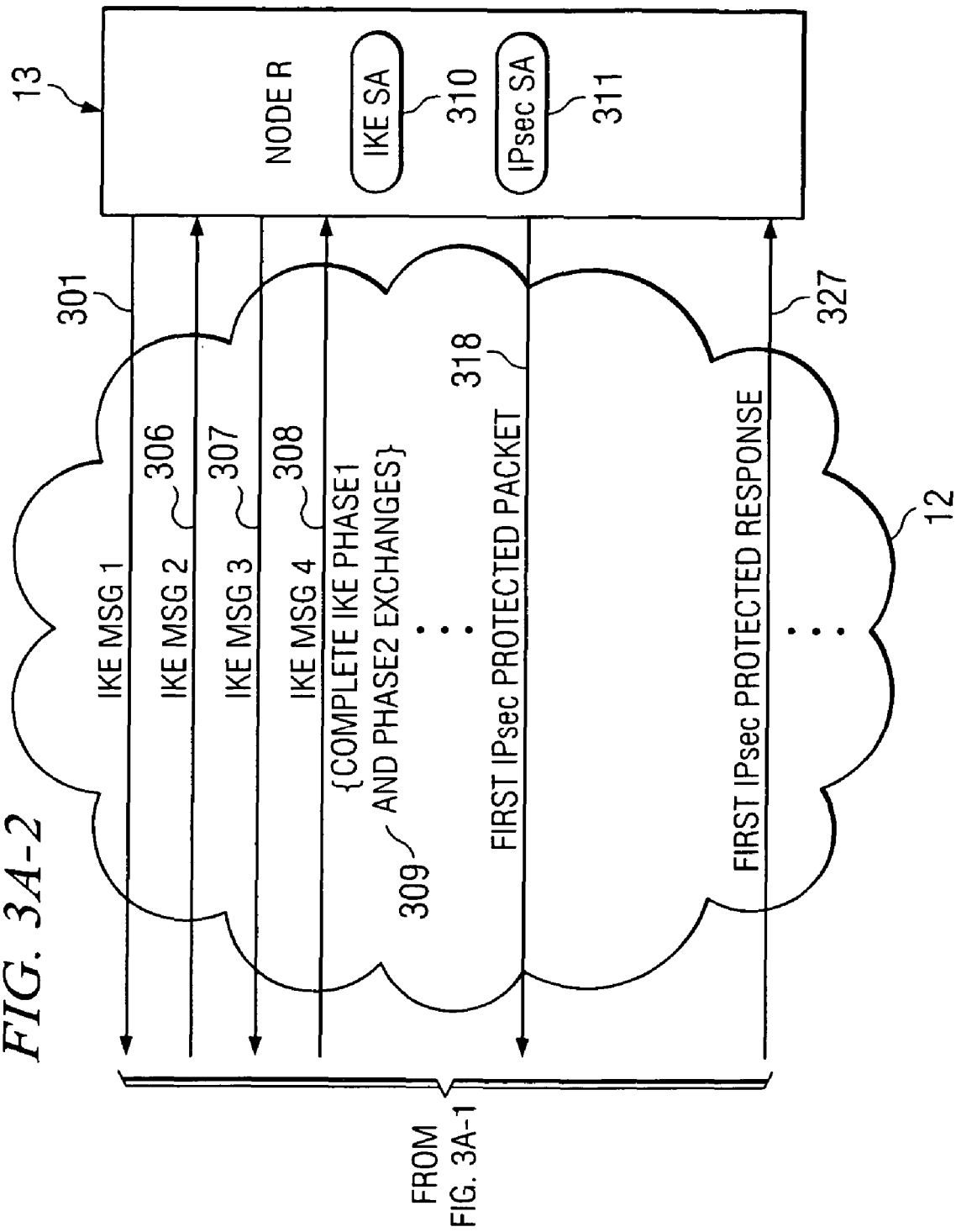

FIG. 2 shows an operational flow diagram for at least one embodiment. In operational block 21, a cluster (such as cluster 11 in FIG. 1) implements cluster aliasing (such as cluster aliasing 104 in FIG. 1) to provide the illusion to clients of a common network address for the cluster. Again, while shown as a separate block for ease of illustration in the example of FIG. 1, such cluster aliasing functionality is typically integrated across the members of a cluster. In operational block 22, the aliased cluster supports communication secured by a communication protocol level security mechanism (e.g., IPsec secured communication). As shown in block 201, in certain implementations the aliased cluster uses distributed processing among a plurality of its members for handling the secured communication. Various example techniques for supporting the secured communication by an aliased cluster are described further below.

An example of one embodiment for supporting IPsec secured communication by an aliased cluster is described in further detail below in connection with FIGS. 3A-3C and 4. Various terms and/or acronyms that may be used in describing this example embodiment are first described, as follows:

"Active SA State" refers to the Security Association state that is updated on a per-packet basis, such as the Authentication Header ("AH") or Encapsulating Security Payload ("ESP") sequence number, and lifetime information. Although there may be multiple copies of an SA in the cluster, the copy that holds the active state is used to apply IPsec protection.

"Directory" refers to one of several cluster-wide, synchronized, in-memory databases used to track the location of IPsec and IKE state (i.e., the member possessing such state) in the cluster.

"Engine-IPM Message" refers to a message in the communication protocol used between the IKE daemon (which is responsible for managing the IPsec security policy of the host and performing any of the IKE negotiations) and the kernel IPsec engine.

"Forwarding PT" refers to a kernel Packet Transform data structure that has been marked to tunnel packets to another cluster member, rather than apply an IPsec transform. A Forwarding PT is associated with a "shadow SA."

"ICS" refers to an Internode Communications Subsystem. ICS provides kernel level communication among nodes of a cluster, in the form of messages and remote procedure calls.

"ICS-Tunneling" refers to the process of transferring a network packet from the kernel on one cluster member to the kernel on another. As used in the below example embodiment, this term refers to a transfer that takes place as part of IPsec processing. Similar tunneling over ICS done by the original cluster alias code is referred to as "base cluster alias tunneling".

"IDMP" refers to an Inter-Daemon Message Protocol, which is a protocol that is the basis of communication among the IKE daemons in a cluster. It is carried over ICS in the below example embodiment.

"IKE-Connection" refers to the context associated with a Phase 1 and related Phase 2 SAs. IKE-Connections are defined in the IKE daemon. One is created when a cluster node sends or receives the first message of an IKE exchange. An IKE-Connection is deleted when the last SA (Phase 1 or Phase 2) created by the IKE-Connection is deleted. Each IKE-Connection is uniquely identified by the source and destination addresses of the message in the below example embodiment. Depending on how the SPD-connection is defined, there might be more than one IKE-Connection per SPD-connection.

"IKE-Negotiator" refers to the cluster member that carried out the IKE negotiation (Phase 1 and 2). In the below example embodiment, the IKE-Negotiator retains the state needed for IKE communication with the remote node, even if another cluster member assumes responsibility for inbound or outbound IPsec processing. For any given IKE-Connection, there exists a single IKE-Negotiator at any given time in the below example embodiment.

"Inbound-Processor" refers to the cluster member responsible for performing IPsec packet transformations for the inbound packets of a Phase 2-Connection. The Inbound-Processor might also be the IKE-negotiator or the Outbound-Processor, but this can change dynamically in the below example embodiment. For any given Phase 2-Connection, there exists a single Inbound-Processor at any given time. However, there may be more than one Inbound-Processor per IKE-Connection.

"IP Routing" is used to identify the forwarding of IP packets done by the base IP stack under control of the routing table. All members of a cluster are enabled for routing in the below example embodiment. Under some circumstances, they may be required to forward packets to each other over the cluster interconnect. Cluster interconnect refers to a private communication link shared by all of the cluster nodes which is used for cluster maintenance and synchronization tasks. This is a different mechanism from ICS-Tunneling, which is used for cluster alias and IPsec processing in the below example embodiment.

"IPM-ICS-Tunneling" refers to a special case of ICS-Tunneling in which an IKE packet received via a socket in the IKE daemon is sent to the kernel to be tunneled to another cluster member.

"IKE Daemon" refers to the IPsec user space component, which includes the policy manager (IPM) and the IKE protocol handler.

"IPsec Engine" refers to the IPsec kernel component responsible for classifying and transforming packets.

"IPM" refers to the IPsec Policy Manager, which is the policy manager component of the IKE daemon.

"Node-Birth" refers to an event detected by the IKE daemon that indicates a new, peer IKE daemon is now participating in the distributed IPsec environment in certain implementations of the below example embodiment.

"Node-Death" refers to an event detected by the IKE daemon that indicates a peer IKE daemon has stopped participating in the distributed IPsec environment in certain implementations of the below example embodiment. The stop may be due to orderly shutdown, failure of the daemon or its cluster member.

"Outbound-Processor" refers to the cluster member responsible for performing IPsec packet transformations for the outbound packets of a Phase 2-Connection. The Outbound-Processor might also be the IKE-Negotiator or the Inbound-Processor for the connection, but this can change dynamically in the below example embodiment. For any given Phase 2-Connection, there exists a single Outbound-Processor at any given time. However, there may be more than one Outbound-Processor per IKE-Connection.

"Phase 1" refers to the initial phase of an IKE negotiation. This phase negotiates the secure, authenticated channel used for further IKE communication and exchanges the information needed to create keying material.

"Phase 2" refers to the second phase of an IKE negotiation. This phase negotiates the Security Associations used for protecting IP traffic.

"Phase 2-Connection" refers to the context associated with the result of a specific IKE Phase 2 negotiation. Associated with the Phase 2-Connection are the SA bundles for applying IPsec packet transformations to the inbound and outbound packets that match the connection. There may be more than one Phase 2-Connection for a given IKE-Connection.

"SA" refers to Security Association. An SA is the result of a Phase 1 or Phase 2 security negotiation in the below example embodiment.

"SA bundle" identifies all the SAs resulting from a single IKE Phase 2 negotiation, for both the inbound and outbound direction.

"Shadow SA" refers to a copy of a Security Association that exists elsewhere in the cluster. In the below example embodiment, a shadow SA is identical to a real SA, except that it does not contain the active SA state, and is associated with a Forwarding PT, rather than one which applies an IPsec packet transform.

"SPD" refers to the Security Policy Database.

"SPD-Connection" refers to an IPsec security policy rule as contained in the Security Policy Database (SPD).

"SPI" refers to a Security Parameter Index, which is the protocol-visible identifier for an SA. In the below example embodiment, SPIs assigned by the cluster (i.e. SPIs for inbound packets) are unique cluster-wide so that an incoming IPsec protected packet can be dispatched to the appropriate Inbound-Processor. SPIs are generated in the IPsec policy manager, and used in the IPsec engine.

"Trigger" occurs when the IPsec engine determines that it needs to apply IPsec protection but does not have a suitable SA in the below example embodiment. The triggering packet is copied from the kernel to the policy manager, which initiates an IKE negotiation.

Figure 3B:
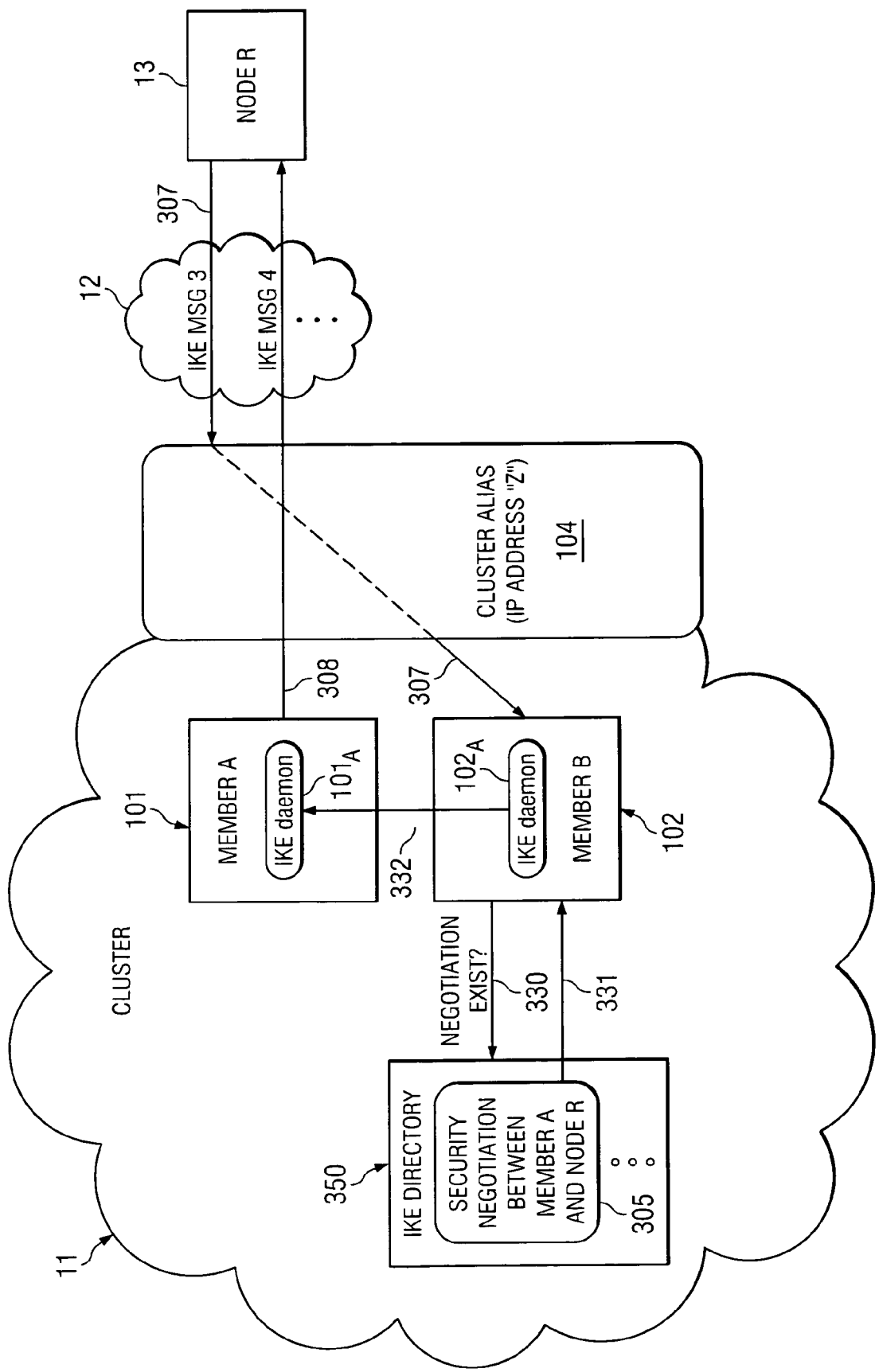

FIGS. 3A-3C show an example embodiment for supporting IPsec secured communication by an aliased cluster. FIG. 3A (formed of FIGS. 3A-1 and 3A-2) shows a scenario for an incoming IPsec protected connection in accordance with one embodiment. The system shown in FIG. 3A includes aliased cluster 11 having Members A 101, B 102, and C 103. Members A-C include IKE daemon processes $101_A$, $102_A$, $103_A$, respectively, running thereon. Cluster 11 implements cluster aliasing 104, whereby remote node R 13 is capable of communicating with alias IP address "Z" via communication network 12. Again, while shown as a separate block for ease of illustration in FIG. 3A, such cluster aliasing functionality is typically integrated across the members of cluster 11.

In the example scenario of FIG. 3A, remote node R 13 initiates a Transmission Control Protocol ("TCP") connection to the cluster alias address "Z" for cluster 11. As discussed above with FIG. 1, three cluster members A 101, B 102, and C 103 are members of the alias. The external network 12 sees the route to the cluster alias via member A 101 throughout this example of FIG. 3A. That is, communication from remote node R 13 addressed to IP address "Z" is received by member A 101 throughout the example scenario of FIG. 3A. Cluster 11 and node R 13 have compatible policies that utilize IPsec encryption in this example. Further, in this example, cluster 11 determines that the TCP service being accessed runs on member B 102.

In this example, remote node R 13 initiates communication with cluster alias IP address "Z". More specifically, an application executing on remote node R 13 sends a data packet addressed to IP address "Z". The outbound IPsec on remote node R 13 finds no SA that has been established for this communication. Therefore, node R 13 sends a first IKE message (referred to as "IKE msg 1") 301 addressed to Z to begin IKE Phase 1. Of course, the specific operation of remote node R 13 may vary in other implementations, and thus the specific operation of node R 13 (e.g., in starting a new IKE exchange) is not limited to this example implementation. The IKE msg 1 301 is received by member A 101 in this example.

Member A 101 finds no local state for this exchange. Therefore, Member A 101 queries (labeled 302) IKE directory 350 to determine if a negotiation for this communication with node R 13 exists (e.g., whether another member of cluster 11 has begun negotiating security for this communication). Member A 101 determines (labeled 303) from IKE directory 350 that no such negotiation exists. Therefore, Member A 101 claims responsibility for the negotiation (i.e., becomes the IKE-Negotiator) and creates (labeled 304) an entry 305 in IKE directory 350 that identifies that a negotiation for this communication exists between Member A 101 and node R 13 (i.e., the entry identifies that Member A 101 is the IKE-Negotiator for this security negotiation with node R 13). The IKE daemon $101_A$ process on Member A 101 then processes the received IKE msg 1 301, and responds with IKE msg 2 306 from LP address "Z" to node R 13.

Node R 13 receives IKE msg 2 306, processes such IKE msg 2 306, and responds with IKE msg 3 307 addressed to IP address "Z". The IKE msg 3 307 is received by Member A 101 in this example. Member A 101 receives IKE msg 3 307 addressed to IP address "Z" and finds a local state for this exchange. That is, there is a non-synchronized local state that handles all the details of the IKE exchange. The IKE Directory 350 resolves which member has this local state based on certain unique IKE selectors. For this reason, the IKE Directory 350 is consulted before handling an IKE packet locally if this local state is not already present. Accordingly, in this example, IKE daemon $101_A$ on Member A 101 processes the received IKE msg 3 307 and responds with IKE msg 4 308 from IP address "Z" to node R 13.

The above process of exchanging IKE messages continues (labeled 309) until IKE Phase 1 and IKE Phase 2 exchanges are completed. Of course, in some instances, an IKE message directed from node R 13 to IP address "Z" during this negotiation process may be received by a member of cluster 11 other than the IKE-Negotiator (Member A 101 in this example). Turning momentarily to FIG. 3B, an example of such a scenario in which IKE msg 3 307 is sent to IP address "Z" and received by aliased Member B 102, rather than being received by IKE-Negotiator Member A 101 as in the example of FIG. 3A. In this example of FIG. 3B, upon member B 102 receiving the IKE msg 3 307, it does not find any local SA state for the exchange and so it queries (labeled 330) IKE directory 350 to determine if a negotiation for this communication with node R 13 exists (e.g., whether another member of cluster 11 is the IKE-Negotiator having claimed responsibility for this negotiation). In this case, Member A 101 has previously claimed responsibility for the negotiation (and is thus termed the IKE-Negotiator) and has created an entry 305 in IKE directory 350, as described above with FIG. 3A. Accordingly, Member B 102 determines (labeled 331) from IKE directory entry 305 that Member A 101 is the IKE-Negotiator for this security negotiation with node R 13. Therefore, Member B 102 transfers (labeled 332) the received IKE msg 3 307 to Member A 101 whereat the IKE daemon $101_A$ process on Member A 101 processes the received IKE msg 3 307 and responds with IKE msg 4 308 from IP address "Z" to node R 13.

Turning back to FIG. 3A, once the IKE Phase 1 and Phase 2 exchanges are complete, node R 13 creates IKE SA 310 and IPsec SA 311 for use in performing the IPsec secured communication with EP address "Z". Likewise, Member A 101 creates IKE SA 312 (with link 390 between IKE directory entry 305 and the IKE SA 312 that it represents) and IPsec SA 313, including inbound IPsec SA 313A and outbound IPsec SA 313B, for use in performing the IPsec secured communication with node R 13. Thus, Member A 101 sets itself as the Inbound-Processor and Outbound-Processor for this secured communication with node R 13. As such, Member A 101 adds (314) an entry 315 for the Phase 2-Connection to the Inbound Directory 351, and Member A 101 adds (316) an entry 317 to Outbound Directory 352. As described above, Inbound Directory 351 and Outbound Directory 352 are visible cluster-wide. In general, entries 315 and 317 identify that the inbound and outbound IPsec SAs for communication with Node R exist on Member A 101. That is, those entries identify that Member A 101 is designated as the Inbound-Processor and the Outbound-Processor for secured communication with node R 13. More particularly, entry 315 identifies that Member A 101 possesses the inbound IPsec SA 313A (and is thus the Inbound-Processor), and entry 317 identifies that Member A 101 possesses the outbound IPsec SA 313B (and is thus the Outbound-Processor).

While in this example, the IKE-Negotiator (Member A 101) establishes itself as the Inbound-Processor and Outbound-Processor upon completion of the security negotiation, in other embodiments, such IKE-Negotiator may select some other member of cluster 11 to be assigned the role of Inbound-Processor and/or Outbound-Processor. For example, certain load-balancing considerations may be evaluated and used for selectively assigning these roles within aliased cluster 11. As a further example, depending on how the communication is initiated by node R 13 (e.g., based on the specific link or requested application accessed by node R 13), an intelligent selection of the most appropriate member to be assigned the role of Inbound-Processor and/or Outbound-Processor may be made.

In the example of FIG. 3A, node R 13 then sends a first IPsec protected data packet 318 addressed to Z. That is, IPsec protected data packet 318 is secured (encrypted and authenticated) using node R's outbound SA, IPsec SA 311. The IPsec protected data packet 318 is received by aliased Member A 101 in this example. Member A 101 receives IPsec protected packet 318 and authenticates and decrypts (319) the packet using its inbound SA, IPsec SA 313A. Member A knows to process the received IPsec protected packet locally because of the local state in its IPsec engine. Member A 101 determines (320) the cluster member to process the received packet, which in this example is determined to be Member B 102. For example, in certain implementations, the received packet passes up the IP stack to base cluster alias code, the cluster alias determines that the service runs on Member B 102, and the cluster alias tunnels the packet to Member B 102 using ICS.

Once determined that the authenticated and decrypted data packet is to be processed by Member B 102, Member A 101 sends (321) that authenticated and decrypted data packet to Member B 102. In certain implementations, Member B 102 receives the authenticated and decrypted data packet via ICS tunnel and the packet is delivered to the destination TCP service. For instance, Member B 102 processes (322) the received packet and prepares a response to node R 13. Upon attempting to send a response, the IPsec engine running on Member B 102 finds no local outbound SA state for the response on Member B 102. For instance, each member of cluster 11 knows that IPsec is being used because of code present in the network stack that is configured by the IKE daemon based on the configured security policy. Thus, Member B 102 is aware that IPsec is being used, but Member B 102 does not have an outbound SA for this communication with node R 13. Member B 102 accesses (323) Outbound Directory 352 and determines from entry 317 that Member A 101 is the Outbound-Processor for this communication. In other words, Member B 102 determines from entry 317 that Member A 101 possesses the active outbound IPsec SA 313B for use in performing secured communication with node R 13. Accordingly, Member B 102 creates (324) a shadow SA and forwarding packet transform to handle further packets. A forwarding packet transform, in this regard, is an instantiated shadow SA, wherein the packet transform is part of the IPsec engine that is present in the network stack. Normally, the IPsec packet transforms encrypt or authenticate the packets but the forwarding packet transform forwards the packet to the cluster node which has the active SA where the IPsec packet is finally processed. Member B 102 sends (325) its response to Member A 101 (e.g., via ICS-Tunneling).

Member A 101 receives the response from Member B 102 (e.g., via ICS tunnel) and applies outbound IPsec processing (326) to protect the response using the outbound SA 313B. Member A 101 then sends the IPsec protected response 327 to node R 13. Node R 13 receives the IPsec protected response 327 and processes it using its inbound SA, IPsec SA 311. Various IPsec protected data messages may continue to be exchanged and processed in the above manner.

Of course, in some instances, an IPsec protected data packet directed from node R 13 to IP address "Z" may be received by a member of cluster 11 other than Inbound-Processor Member A 101. Turning momentarily to FIG. 3C, an example of such a scenario is shown in which an IPsec protected data packet 341 is sent to IP address "Z" and received by aliased Member C 103, rather than being received by aliased Member A 101 as in the example of FIG. 3A. Member C 103 receives IPsec protected packet 341 and determines that it does not possess the active SA for authenticating/decrypting this IPsec protected packet. More specifically, inbound IPsec processing finds no SA for the received packet 341 on Member C 103, and so Member C 103 accesses (342) Inbound Directory 351 and determines from entry 315 that Member A 101 is the Inbound-Processor for this communication. In other words, Member C 103 determines from entry 315 that Member A 101 possesses the active inbound IPsec SA 313A for use in performing secured communication with node R 13. Accordingly, Member C 103 forwards (344) the received IPsec protected packet 341 to Member A 101 (e.g., via ICS-Tunneling). Upon receiving such packet, Member A 101 is capable of authenticating/decrypting (345) the packet using its inbound IPsec SA 313A Thereafter, Member A 101 may handle the authenticated/decrypted packet by determining which member is to process it, etc., as described above in FIG. 3A.

Member C 103 may, in certain implementations, request from the IKE-Negotiator (Member A 101 in this example) a copy of the SA bundle for this communication so that Member C 103 can create a shadow SA 343 and forwarding packet transform to handle further packets received from node R 13. The example of FIG. 3C shows Member A 101 providing (346) the requested SA bundle to Member C 103. Without the shadow SA bundle and forwarding packet transform, Member C 103 can still forward received packets to Member A 101 by looking up the Inbound-Processor in the Inbound Directory 351 (as performed for packet 341 via look-up 342 in the above example). However, creating shadow SA 343 on Member C 103 in accordance with certain embodiments provides a performance enhancement.

While shown as separate elements in the example of FIGS. 3A-3C, in certain embodiments IKE Directory 350, Inbound Directory 351, and Outbound Directory 352 are virtual. That is, in practice, each member keeps a copy of each directory synchronized across the cluster, in certain embodiments.

Further, in certain embodiments, the IPsec processing occurs in each member in two major components, the member's IKE daemon and the kernel's network stack. The IKE daemon handles IKE negotiations and security policy. The network stack enforces the security policy and performs the actual IPsec packet processing.

Figure 4A:
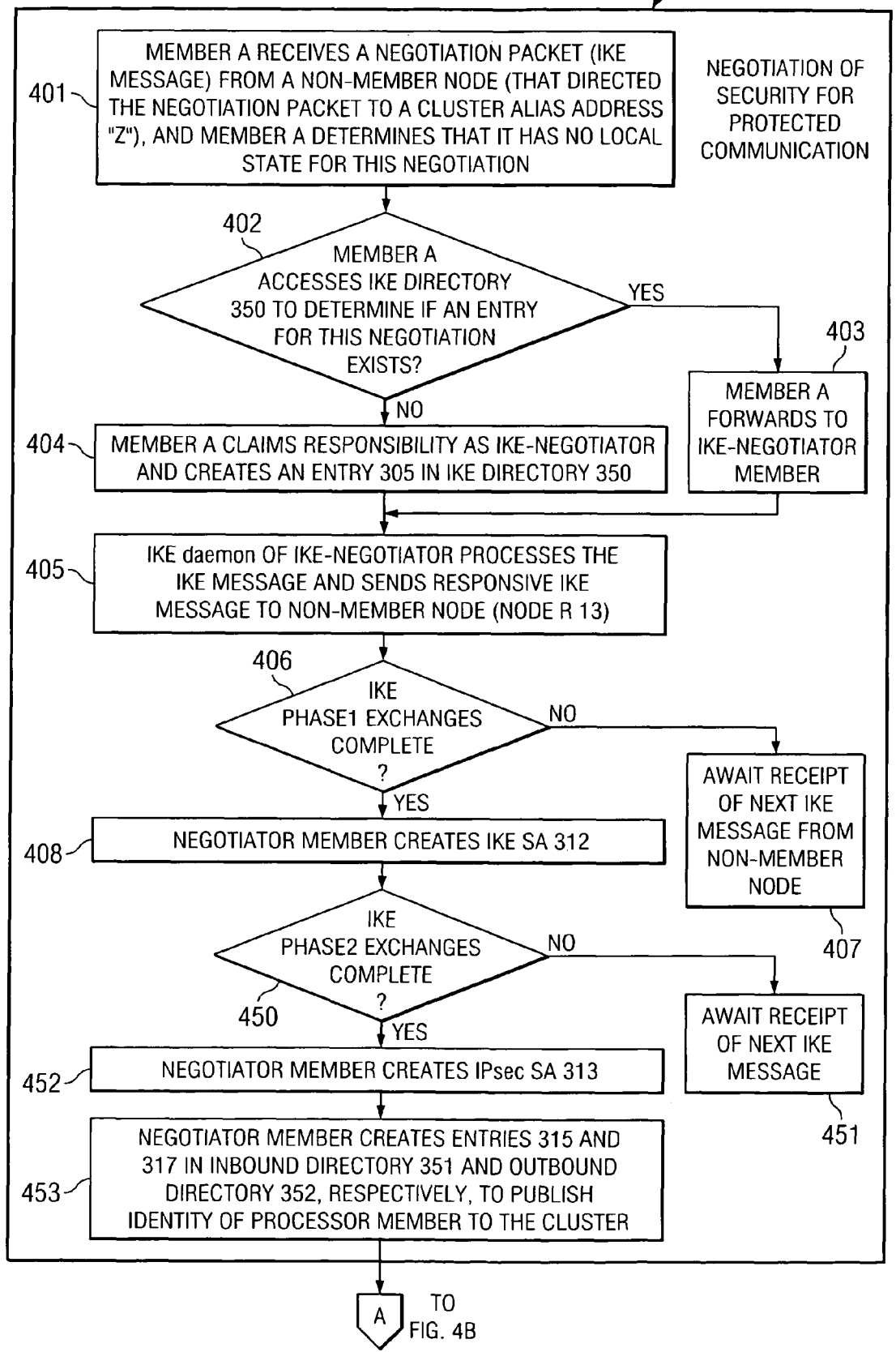
Figure 4B:
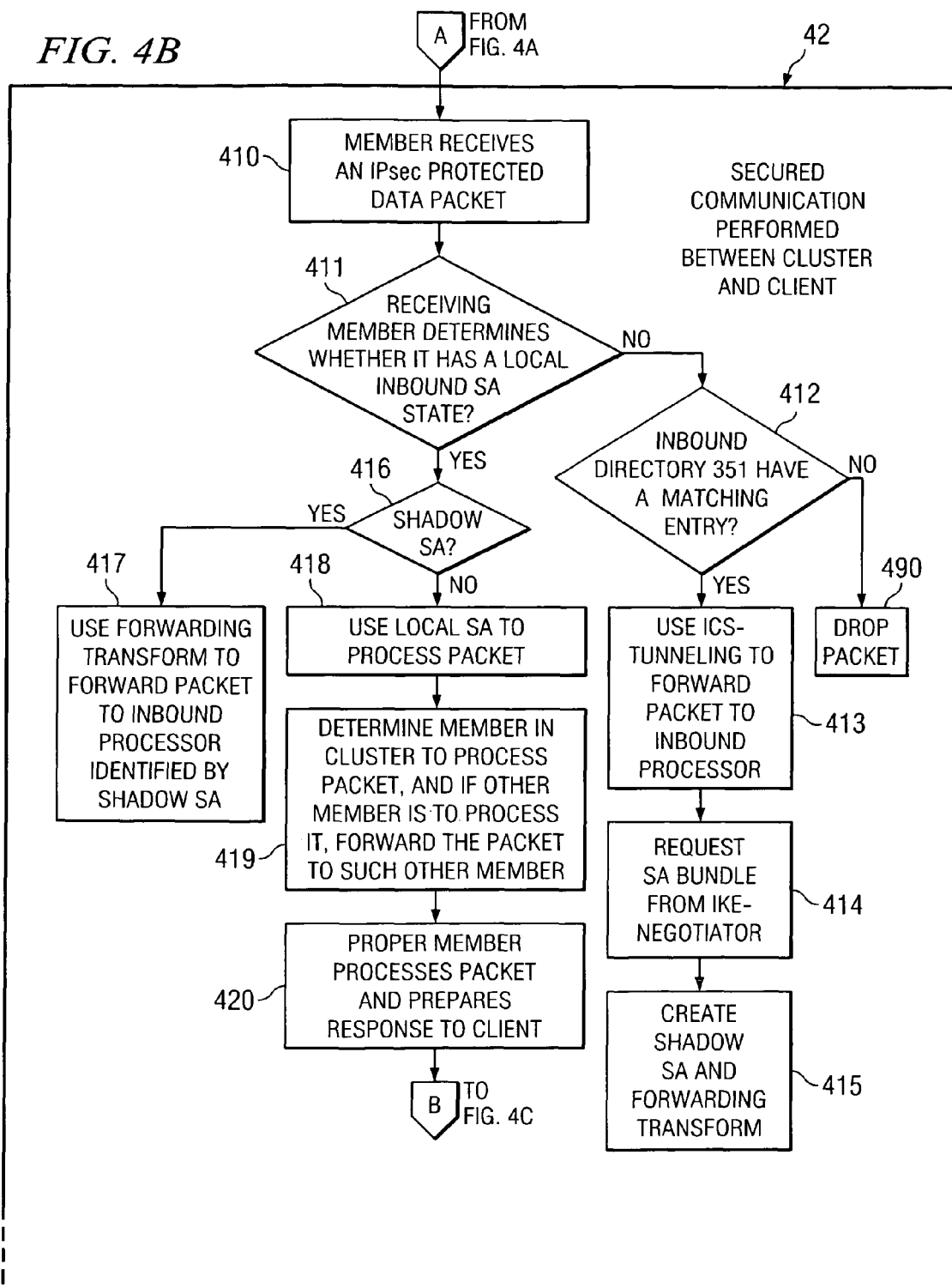

Turning to FIGS. 4A-4C, an operational flow for a member of an aliased cluster according to one embodiment, such as the example embodiment of FIGS. 3A-3C, is shown. This example flow has two general operations (labeled 41 and 42 in FIGS. 4A-4C) for performing IPsec secured communication between a non-member node and an aliased cluster. In operational block 41 (FIG. 4A), negotiation of security for protected communication is performed between the cluster and the non-member node. For instance, when using the IPsec security mechanism, an IKE negotiation is performed. In operational block 42 (FIGS. 4B-4C), secured communication (e.g., IPsec secured communication) is performed between the cluster and the non-member node. The operations of a cluster member in each of general operations 41 and 42 in accordance with one embodiment are further described hereafter in connection with FIGS. 4A-4C.

In the negotiation operation 41, a member (Member A in this specific example) receives a negotiation packet (IKE message) from a non-member node in operational block 401. That is, the non-member node (e.g., node R 13 of FIGS. 3A-3C) sends the negotiation packet to alias address "Z", and a given member (e.g., Member A) of the aliased cluster receives such packet. Further, in operational block 401, Member A determines that it has no local state for this negotiation. Therefore, in block 402, Member A accesses IKE Directory 350 to determine if an entry for this negotiation exists. If determined that an entry for this negotiation does exist in IKE Directory 350, then operation advances to block 403 whereat Member A forwards the received negotiation packet to the IKE-Negotiator member identified in such entry of the IKE Directory 350. Otherwise, if an entry for this negotiation is determined not to exist in IKE Directory 350, then operation advances from block 402 to block 404 whereat Member A claims responsibility for the negotiation (becomes the IKE-Negotiator for this security negotiation) and creates an entry 305 in IKE Directory 350.

In operational block 405, the IKE daemon process of the IKE-Negotiator processes the received negotiation packet (IKE message) and sends a responsive message (a responsive IKE message) to the non-member node. In block 406, the IKE-Negotiator determines whether IKE Phase 1 exchanges are complete. That is, the IKE-Negotiator determines whether the security negotiation for IKE Phase 1 with the non-member node is complete. If not, then operation advances to block 407 whereat the IKE-Negotiator awaits receipt of the next IKE message from the non-member node (either directly or forwarded from another member, as in operational block 403). Once determined in block 406 that the IKE Phase 1 exchanges are complete, the IKE-Negotiator creates IKE SA 312 in block 408.

In block 450, the IKE-Negotiator determines whether the IKE Phase 2 exchanges are complete. If not, then operation advances to block 451 whereat the IKE-Negotiator awaits receipt of the next IKE message from the non-member node. Once determined in block 450 that the IKE Phase 2 exchanges are completed, the IKE-negotiator creates inbound and outbound IPsec SAs 313A and 313B to become the Inbound-Processor and Outbound-Processor for secured communication with the non-members node (in block 452), and the IKE-Negotiator creates (in block 453) entries 315 and 317 in Inbound Directory 351 and Outbound Directory 352, respectively, to publish the identity of the Inbound-Processor and Outbound-Processor to the cluster.

Operation then advances (via Connector "A" in FIGS. 4A-4B) to general operational block 42 for performing secured communication between the aliased cluster and the non-member node. In operational block 410, a member of the cluster receives an IPsec protected data packet. That is, the non-member node directs an IPsec protected data packet to alias address "Z", and a member of the cluster associated with that alias address receives the packet. In block 411, the receiving member determines whether it has any local inbound SA state for this IPsec communication. If not, operation advances to block 412 whereat the receiving member accesses Inbound Directory 351 and determines the Inbound-Processor for this communication. If a matching entry (identifying an Inbound-Processor) for this received packet is not found in Inbound Directory 351, then the packet is dropped in block 490. Otherwise, in block 413, the receiving member uses ICS-Tunneling to forward the received packet to the Inbound-Processor identified by the Inbound Directory 351.

In this example embodiment, the member who originally received the packet then, in block 414, requests the SA bundle from the IKE-Negotiator for this communication, and upon receiving such SA bundle creates, in block 415, a shadow SA and forwarding packet transform. Having such a shadow SA and forwarding packet transform provides enhanced performance in the event that this receiving member receives another packet of this communication (e.g., because a lookup of the Inbound-Processor in the Inbound Directory 351 is not required).

If, in block 411, the receiving member determines that it possesses the local inbound SA state, operation advances to block 416 whereat the receiving member determines whether the possessed inbound SA state is a shadow SA. If it is a shadow SA, then the receiving member uses the forwarding packet transform to forward the packet to the Inbound-Processor identified by the shadow SA in block 417. On the other hand, if determined in block 416 that the inbound SA state is not a shadow SA, then the receiving member is the Inbound-Processor and thus uses its local SA to process (i.e., authenticate and decrypt) the received packet in block 418. In block 419, this Inbound-Processor determines the member in the cluster to process the authenticated/decrypted packet, and if another member is to process it, the Inbound-Processor forwards the packet to such other member (as with Member A 101 forwarding the packet to Member B 102 for processing in the above example of FIG. 3A).

In block 420, the determined proper member processes the packet and prepares a response to the non-member node. In block 421 (FIG. 4C), the member that prepared the response determines whether it possesses any local outbound SA state for this IPsec protected communication with the non-member node. If not, operation advances to block 422 whereat the member accesses Outbound Directory 352 in attempt to determine the Outbound-Processor. If a matching entry for this outbound communication is not found in Outbound Directory 352, then this member that prepared the response attempts to claim an IKE-Connection to the non-member node in block 491 in attempt to negotiate an SA for this communication. If this operation fails because an IKE negotiation already exists (with another member), the packet is transferred to the IKE-Negotiator using the ICS-Tunneling mechanism. Thus, in block 492, the member that prepares the response determines if it is successful in claiming the IKE-Negotiator role. If it is not successful, then this member that prepared the response forwards the response to the existing IKE-Negotiator in block 495. If the member that prepared the response successfully claims the IKE-Negotiator role, then it handles the IKE processing in block 493. Then, in block 494 operation advances (e.g., to block 428 described below) for using the negotiated outbound SA for sending the response to the non-member node. While various examples are provided herein in which the non-member node initiates communication with the aliased cluster, in certain instances the aliased cluster may initiate the communication with a non-member node. In this instance, a cluster member may initiate IKE negotiation for an SA for such communication, such as in block 491 in this example.

If a matching entry for this response is found in Outbound Directory 352 (in block 422), then in block 423 the number that prepared the response uses the forwarding packet transform to forward the response to the Outbound-Processor identified by the Outbound Directory 352. In this example embodiment, the member that prepared the response, in block 424, requests the SA bundle from the IKE-Negotiator for this communication. Upon receiving such SA bundle creates, in block 425, a shadow SA and forwarding packet transform. Having such a shadow SA and forwarding packet transform provides enhanced performance in the event that this receiving member receives another packet of this communication (e.g., because a lookup of the Inbound-Processor in the Inbound Directory 351 is not required).

On the other hand, if determined in block 421 that the member that prepared the response possesses the local outbound SA state, operation advances to block 426 whereat it determines whether the possessed outbound SA state is a shadow SA. If the state is a shadow SA, then the member uses the forwarding packet transform to forward the packet to the Outbound-Processor identified by the shadow SA in block 427. On the other hand, if determined in block 426 that the outbound SA state is not a shadow SA, then the member that prepared the response is the Outbound-Processor and thus uses its local SA to encrypt the response and sends this IPsec protected response to the non-member node in block 428.

For the above cases in which a packet (e.g., response) is forwarded to an Inbound-Processor or to an Outbound-Processor, upon such member receiving the forwarded packet its operation may, in certain implementations, proceed for handling the packet following the example flow beginning at operational block 410 (FIG. 4B). For instance, upon an Inbound-Processor receiving (in block 410) an IPsec protected packet that was forwarded from another member, the Inbound-Processor may determine in block 411 that it has a local inbound SA state, determine in block 416 that such local inbound SA state is not a shadow SA, and thus proceed to block 418 whereat it uses its local SA to decrypt the packet, etc.

In certain embodiments, the distributed handling of protected communication by an aliased cluster may be dynamically adapted to improve efficiency. For instance, in certain implementations, continued use of the forwarding packet transform for responses from Member B 102 to Member A 101, as in the example of FIG. 3A, may result in migration of the active outbound SA 313B from Member A 101 to Member B 102, thereby eliminating the IPsec related tunneling operation for each response generated by Member B 102.

Figure 5B:
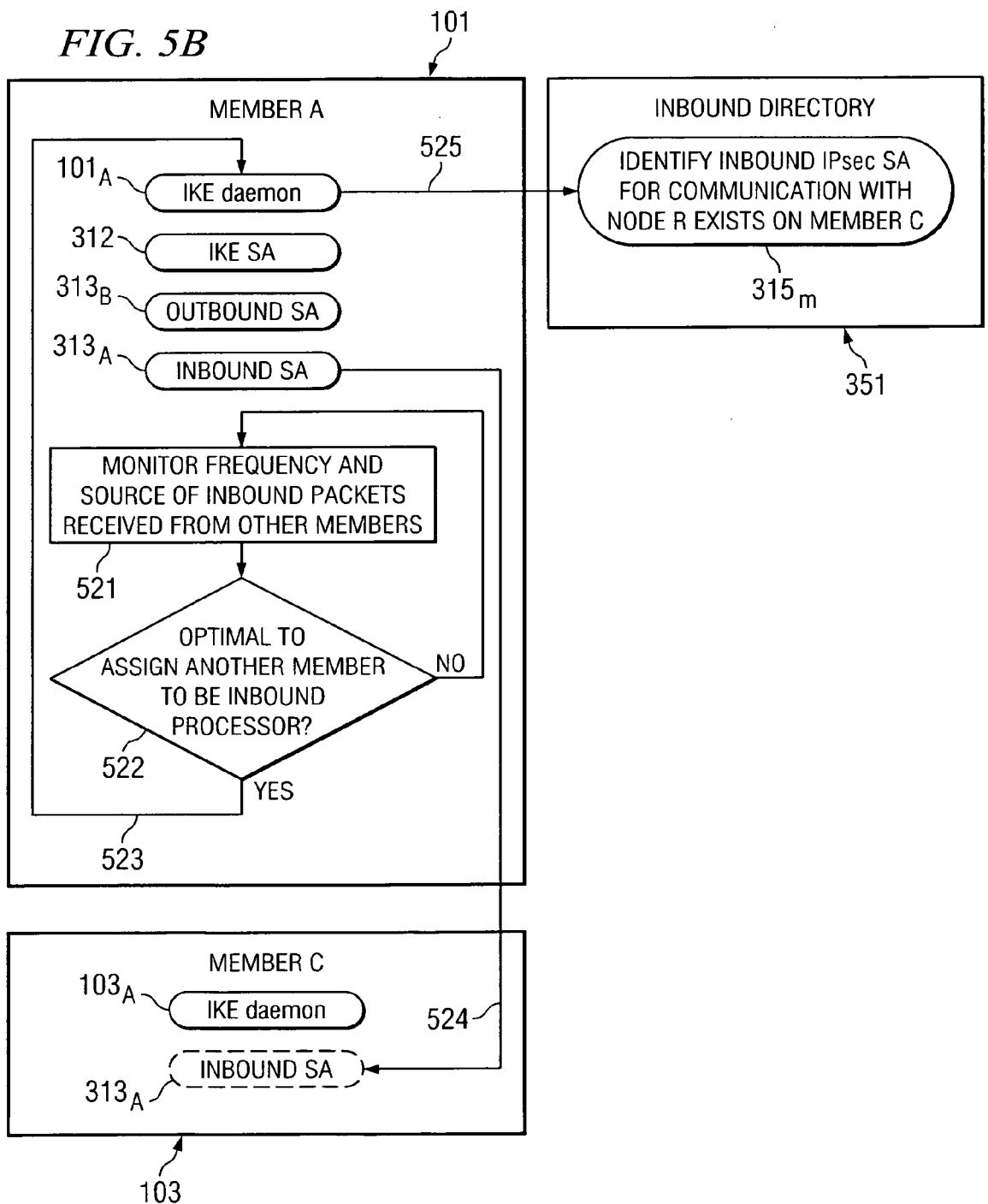
FIG. 5B shows an example of migrating the role of Inbound-Processor from one member of a cluster to another member in accordance with one embodiment.

Turning to FIGS. 5A-5B, examples of dynamically migrating the IPsec SAs to appropriate cluster members for improving the efficiency of the cluster handling the IPsec protected communication in accordance with one embodiment are shown. FIG. 5A shows an example of migrating the outbound IPsec SA 313B from Member A 101 to Member B 102 in accordance with one embodiment. FIG. 5B shows an example of migrating the inbound IPsec SA 313A from Member A 101 to Member C 103 in accordance with one embodiment.

As described above with the example embodiment of FIGS. 3A-3C, for a Phase 2-Connection involving a cluster alias address, three IPsec processing roles are defined for a given communication session (e.g., for communicating with node R 13): 1) *IKE-Negotiator*, 2) *Outbound-Processor*, and 3) *Inbound-Processor*. By default, when a cluster member becomes the IKE-Negotiator, the cluster member will automatically become the Outbound-Processor and Inbound-Processor upon the completion of Phase-2 negotiation in the example embodiment of FIGS. 3A-3C. For instance, in the example of FIG. 3A, Member A 101 is the IKE-Negotiator, and upon completion of the security negotiation, Member A 101 becomes the Outbound-Processor and Inbound-Processor (and is therefore identified in the Inbound Directory and Outbound Directory as possessing the Inbound IPsec SA 313A and the Outbound IPsec SA 313B, respectively). However, in some instances the IKE-Negotiator might not be the member generating the majority of outbound traffic for the connection. For example, in FIG. 3A, Member B 102 performs the processing and generates a response for node R 13. Such traffic requires an extra trip through the ICS-Tunneling mechanism to reach the Outbound-Processor. That is, the response generated by Member B 102 in the example of FIG. 3A is sent back to Member A 101, as the Outbound-Processor, to secure (e.g., encrypt) the response to be sent to node R 13. A similar situation might exist for inbound traffic, especially if there are changes to routes or proxy ARP settings. For instance, in the example of FIG. 3C, Member C 103 receives an inbound packet and forwards it to the Inbound-Processor, Member A 101. The extra tunneling trips introduce latency and ICS-Tunneling overhead.

To address this issue, certain embodiments, such as that of FIGS. 3A-3C, allow the processing roles for a given Phase 2-Connection to be split apart. Accordingly, the roles may be dynamically migrated to an optimal member for improved efficiency. In certain embodiments, the location of the IKE-Negotiator role does not change, but the role of Inbound-Processor and Outbound-Processor can be transferred independently from one cluster member to another. This migration can continue over the life of the SA to respond to changing traffic patterns, without interrupting the flow of traffic. An example of dynamically transferring the role of Outbound-Processor in accordance with one embodiment is described hereafter in connection with FIG. 5A, and an example of dynamically transferring the role of Inbound-Processor in accordance with one embodiment is described hereafter in connection with FIG. 5B.

FIG. 5A shows Member A 101 resulting from the operation of FIG. 3A described above. Accordingly, Member A 101 is the IKE-Negotiator (possessing IKE SA 312), Outbound-Processor (possessing outbound IPsec SA 313B), and Inbound-Processor (possessing inbound IPsec SA 313A) for communication with node R 13. In operational block 501, Member A 101 monitors the frequency and source of packets ICS-Tunneled from other members for IPsec processing. For instance, in the example of FIG. 3A, a response packet is forwarded from Member B 102 to Member A 101. Analyzing the traffic over some period of time, Member A 101 determines in block 502 whether another member is an optimal member to be assigned Outbound-Processor (for improved efficiency). For instance, if Member B 102 is repeatedly generating the response for node R 13 and forwarding such response to Member A 101 for securing the response to be sent to node R 13, it may be more efficient to assign Member B 102 as Outbound-Processor so that Member B 102 can secure its generated responses and communicate them to node R 13 without requiring the responses to be forwarded to Member A 101.

If determined in block 502 that Member B 102, for example, is the optimal member to be the Outbound-Processor, the IPsec engine of Member A 101 sends a message 503 to its IKE daemon requesting transfer of the Outbound-Processor role to Member B 102. Member A 101 transfers 504 the outbound IPsec SA 313B to Member B 102, and updates 505 Outbound Directory 352 to reflect that Member B is now the Outbound-Processor for this communication. For instance, entry 317 of FIG. 3A is updated in Outbound Directory 352 to reflect in the resulting modified entry 317$_m$ that the outbound IPsec SA (313B) is now possessed by Member B 102.

As a further example of dynamically migrating the Outbound-Processor role to an optimal member of a cluster in accordance with one example implementation, consider the following scenario in which a four-member aliased cluster is implemented via TruCluster, wherein for some example connection (e.g., for communication with a given non-member node, such as node R 13), the cluster members have the following roles and responsibilities:

Member A is the Outbound-Processor. For packets matching the connection, Member A applies the outbound IPsec packet transforms. Inbound packets matching the connection are ICS-Tunneled from Member A to Member B, which has the role of Inbound-Processor. Lifetime expiration events for the outbound SAs are sent to Member C, which has the role of IKE-Negotiator.

Member B is the Inbound-Processor. For packets matching the inbound connection, Member B applies the inbound IPsec packet transforms. Outbound packets matching the connection are ICS-Tunneled from Member B to Member A. Lifetime expiration events for the inbound SAs are sent to Member C.

Member C is the IKE-Negotiator and is responsible for rekeying. In general, keying is the process of renegotiating IPsec and IKE SA keys using IKE. SAs negotiated using IKE have a set lifetime, either in seconds or bytes transferred. It is rare that an IPsec protected communication channel will only use one set of SAs/keys. Outbound packets matching the connection are ICS-Tunneled from Member C to Member A. Inbound packets matching the connection are ICS-Tunneled from Member C to Member B.

Member D is sending and receiving traffic for the connection in this example scenario, but Member D does not have a processing role. Outbound packets matching the connection are ICS-Tunneled from Member D to Member A. Inbound packets matching the connection are ICS-Tunneled from Member D to Member B.

Figure 6:
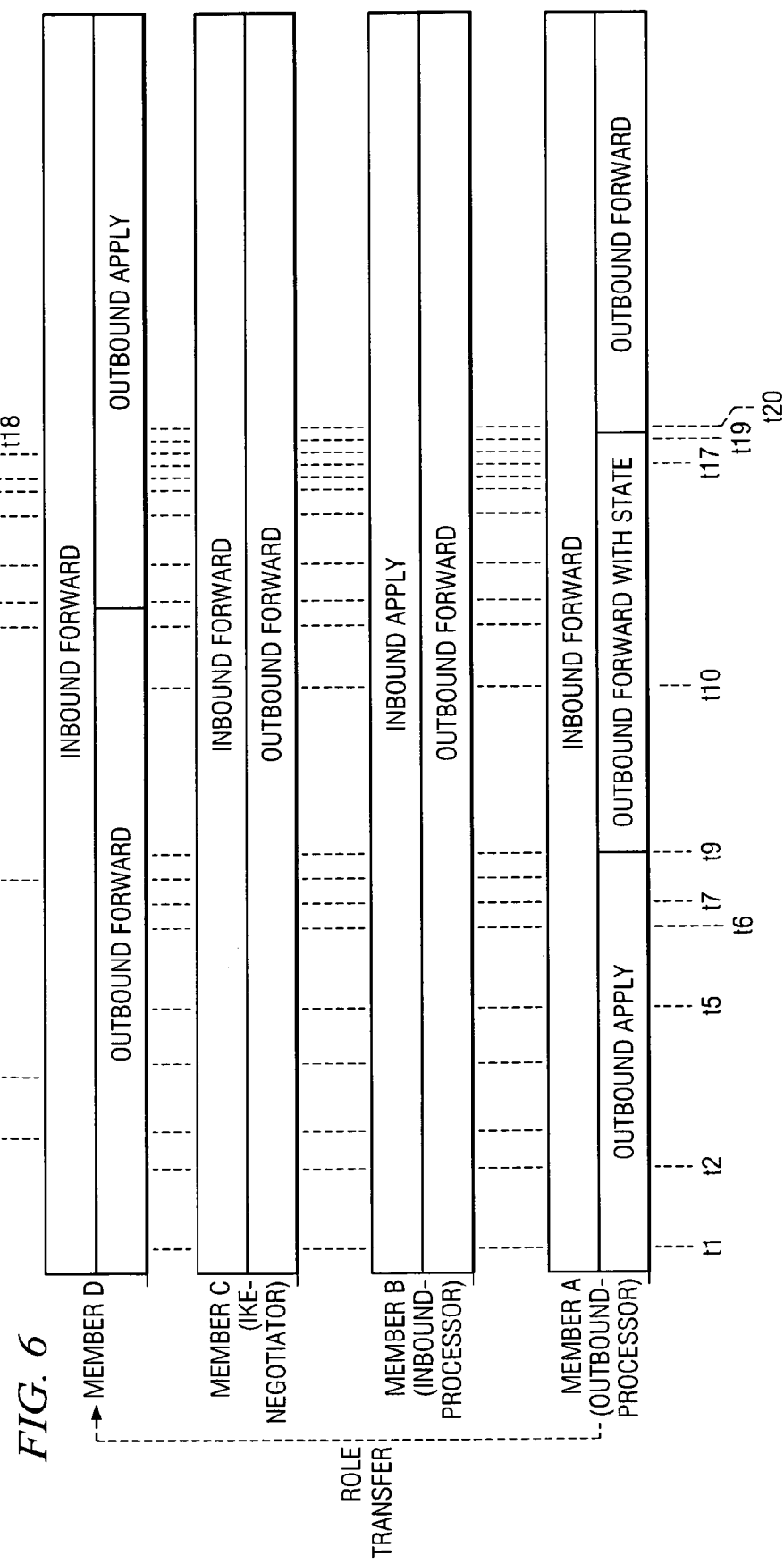
FIG. 6 shows an illustration of migrating the role of Outbound-Processor from one member of an aliased cluster (Member A) to another member (Member D) in accordance with one example embodiment.

In the following example, which is illustrated in FIG. 6, the Outbound-Processor role is dynamically transferred from Member A of the cluster to Member D. For simplicity, the following description for this example implementation is in terms of what happens to the SAs involved. When the IKE daemon changes SA state, a corresponding change in the related kernel IPsec packet transform state is assumed. When the IPsec engine initiates a change in state, the change is applied to both the packet transform and the SA in the IKE daemon in this example implementation.

At time t1, the Outbound-Processor (Member A) keeps track of the frequency and source of packets ICS-Tunneled to it for IPsec processing. Analyzing the traffic over some period of time, Member A determines that it is optimal for Member D to be the Outbound-Processor. The IPsec engine of Member A sends a message to its IKE daemon requesting transfer of the Outbound-Processor role to Member D. Member A will continue processing the packet that initiated the sequence, and will continue to be the Outbound-Processor at this point.

At time t2, the IKE daemon of Member A gets a message from the kernel and sends an IDMP SA transfer "request" message to the IKE daemon of Member D; and at time t3, the IKE daemon of Member D receives the IDMP SA transfer "request" message. At time t4, Member D decides to accept the transfer. The IKE daemon of Member D sends an IDMP SA transfer "accept" message to Member A to accept the responsibility. If, in this example implementation, Member D refuses to be the Outbound-Processor, Member D returns an IDMP SA transfer "reject" message. At time t5, the IKE daemon of Member A receives the IDMP SA transfer "accept" acknowledgement from member D. Member A keeps track of the transfers it has pending, and associates the "accept" with the correct transfer.

At time t6, before moving on to the transfer process, the IKE daemon of Member A first notifies the IKE-Negotiator, Member C, by sending a IDMP SA transfer "starting" message. The IKE-Negotiator is responsible for clean up if any members involved in the transfer terminate unexpectedly. That is, the IKE-Negotiator attends to appropriate actions for completing and/or otherwise handling the transfer being performed by such terminated members. If Member C terminates (dies) before or after receiving this message, a generic clean-up process for the death of the IKE-Negotiator cleans up all the related SAs. If Member D dies, the IKE-Negotiator performs the clean-up of the pending transfer list described in connection with time t8 below.

At time t7, the IKE daemon of member A sends a message to the kernel to switch the related outbound SAs' packet transform to stop processing packets locally and forward them to Member D with the related SA state. At time t8, the IKE daemon of Member C receives the IDMP SA transfer "starting" notification message from Member A. As the IKE-Negotiator, member C keeps a list of cluster member pairs that are doing role transfer. This list allows for recovery in case any participating members fail (die) during the transfer.

At time t9, the IPsec engine of member A receives the packet transform switch message from its own IKE daemon. Member A freezes the state of the current outbound SAs (i.e. sequence number, byte lifetime, etc.) by changing the packet transform to stop processing packets locally and start forwarding them with the frozen SA state attached. This process is the same as the forwarding packet transform except that the process forwards each related outbound packet to Member D along with the current frozen outbound SAs' state. This approach is intended to ensure a smooth transfer by preventing packets from looping during the time period after Member A starts forwarding and before Member D starts processing the IPsec packets locally (between times t9 and t12). During this period, both Member A and Member D are forwarding IPsec packets for the SA being transferred. Since Member D receives SA state attached to the ICS-Tunneled packet, Member D can update the existing SAs and start processing IPsec packets locally right in the middle of the forwarding packet transform. Therefore, there will not be any prolonged bouncing of packets between Member A and Member D during this period. In the case where Member D is the initiator of the packet, Member D forwards the packet (between times t9 and t12) and tunnels the packets to Member A. Member A then attaches the frozen SAs' state to the tunneled packet back to Member D. Member D then will switch to applying the packet transform in the middle of processing the packet. The time period between times t9 and t12 can be extremely short because any packet tunneled by Member A with the frozen SA state attached can cause member D to start processing packets locally.

At time t10, whenever Member A needs to tunnel a related packet to Member D, Member A attaches the current state of the related outbound SAs. It is possible there will be multiple packets for these SAs between times t9 and t12. Member D allows for multiple packets and does not update the SAs' state more than once. It is also possible that Member A has no packets for the connection for an extended period. The interval between times t9 and t12 could, in some instances, be very long. This interval is not a problem, however. If there are no packets at all for that particular IPsec flow, it should not matter how long the transition lasts. Since the IKE-Negotiator is already aware of the on-going role transfer, it will be able to clean up if any participants fail during this interval.

At time t11, the IPsec engine of Member D receives the frozen outbound SAs states from Member A attached to a tunneled packet. At time t12, the IPsec engine of Member D updates the existing outbound SAs in the IPsec engine. Member D then switches the processing action from forwarding packets to processing them locally. Finally, Member D performs the IPsec packet transform on the forwarded packet. As mentioned in time t10, there might be multiple of this type of packets, and Member D makes sure that it does not update the outbound SAs more than once.

At time t13, the IPsec engine of Member D sends the status of the outbound SAs' states to the IKE daemon so that it can update the related data structures. At time t14, the IKE daemon of Member D sends an IDMP SA transfer "done" message to Member A to notify it that the transfer of Outbound-Processor role has completed and that Member D is now the Outbound-Processor. At time t15, the IKE daemon of Member D sends an IDMP SA transfer "done" notification message to the IKE-Negotiator, Member C, to notify it that the role transfer is complete. At time t16, the IKE daemon of Member A receives the IDMP SA transfer "done" message from Member D. At time t17, the IKE daemon of Member C receives the IDMP SA transfer "done" message from Member D. In this example implementation, the events in times t16 and t17 could occur in different order.

At time t18, the IKE daemon of member C, the IKE-Negotiator, receives the IDMP SA transfer "done" message and removes the transfer-pairs from its list of pending role transfers. Member C updates the Outbound Directory and all relevant local data structures to indicate the new Outbound-Processor. At time t19, upon reception of the IDMP SA transfer "done" message the IKE daemon of Member A, the initiator of the transfer, sends a notification to the kernel. This notification switches the related outbound SAs' actions to forward. At time t20, the IPsec engine of Member A receives the notification message and switches the related outbound SAs to forward. Packets that need to be tunneled to Member D will no longer require the attachment of the frozen SAs' states.

At this point, Members B and C may still be forwarding using an old set of SAs. When packets are ICS-Tunneled between cluster members, the ID for the outbound or inbound SA bundle is attached. This attachment allows the processor (Member A in this case) to determine whether the forwarding member is still using the old SAs. If so, the kernel IPsec engine sends a message to the IKE daemon. The daemon then sends an IDMP SA "delete" message to the forwarding member to delete the old SAs.

During period of time between t19 and t20, both Members B and C still think that the Outbound-Processor is Member A. They continue to ICS-Tunnel packets for the related IPsec flow to Member A. These packets will not be lost in this example implementation. Rather, Member A tunnels the packets with attachment of the frozen SAs' states to Member D. Also, during this period if either of Members A or D die (fail), a Node-Death mechanism will notify the IKE-Negotiator, Member C. Member C then looks through its pending transfer list and cleans up the surviving node of the transfer pair by deleting its existing SA. If at any point during this cleanup the IKE-Negotiator (Member C) also dies, the normal cleanup performed for the death of an IKE-Negotiator will remove the SAs involved in the role transfer.

After time t20, Members B and C still think that Member A is the Outbound-Processor. Packets for the connection are still sent to Member A. Member A continues to tunnel these packets to Member D. However, Member A does not need to attach any SA state because it knows that Member D is already the Outbound-Processor. As described in t20, the IKE daemon of Member A also sends an IDMP SA "delete" message to Member B or C so that they can adjust accordingly. If Member B or Member C continues to generate traffic for the SA, normal outbound packet processing creates a new shadow SA for them pointing to Member D.

Turning now to FIG. 5B, an example of dynamically transferring the role of Inbound-Processor in accordance with one embodiment is shown. FIG. 5B shows Member A 101 resulting from the operation of FIG. 3A described above. Accordingly, Member A 101 is the IKE-Negotiator (possessing IKE SA 312), Outbound-Processor (possessing outbound IPsec SA 313B), and Inbound-Processor (possessing inbound IPsec SA 313A) for communication with node R 13. In operational block 521, Member A 101 monitors the frequency and source of inbound packets ICS-Tunneled from other members for IPsec processing. For instance, in the example of FIG. 3C, an inbound packet is forwarded from Member C 103 to Member A 101. Analyzing the traffic over some period of time, Member A 101 determines in block 522 whether another member is an optimal member to be assigned Inbound-Processor (for improved efficiency). For instance, if Member C 103 is repeatedly receiving inbound packets and forwarding those packets to Member A 101 for IPsec processing in accordance with the inbound IPsec SA, it may be more efficient to assign Member C 103 as Inbound-Processor so that Member C 103 can process the received packets without requiring them to be forwarded to Member A 101.

If determined in block 522 that Member C 103, for example, is the optimal member to be the Inbound-Processor, the IPsec engine of Member A 101 sends a message 523 to its IKE daemon requesting transfer of the Inbound-Processor role to Member C 103. Member A 101 transfers 524 the inbound IPsec SA 313A to Member C 103, and updates 525 Inbound Directory 351 to reflect that Member C is now the Inbound-Processor for this communication. For instance, entry 315 of FIG. 3A is updated in Inbound Directory 351 to reflect in the resulting modified entry $315_m$ that the inbound IPsec SA (313A) is now possessed by Member C 103. In accordance with one example implementation, the transfer process for transferring the Inbound-Processor role may be performed in a manner similar to the example scenario described above for the transfer of the Outbound-Processor role.

FIG. 7 shows an operational flow diagram for dynamically transferring roles for a given communication session (e.g., with a given non-member node) between members of an aliased cluster in accordance with one embodiment. In operational blocks 71-73, the roles of IKE-Negotiator, Inbound-Processor, and Outbound-Processor are assigned to a member of the aliased cluster. As described above, in certain embodiments the member assigned as IKE-Negotiator initially assigns itself to be both Inbound-Processor and Outbound-Processor. Of course, in other embodiments, the IKE-Negotiator may assign other members to initially be the Inbound-Processor and/or Outbound-Processor (e.g., for load balancing considerations, etc.).

In operational block 74, IPsec secured communication with the non-member node is performed (e.g., IPsec protected data packets are received from and sent to the non-member node). During such secured communication, the members assigned various roles monitor the handling of the communication and determine whether to transfer their assigned roles to another member for improved efficiency. For instance, in block 701 the Inbound-Processor monitors the frequency and source of inbound packets forwarded from other members. In block 702, the Inbound-Processor determines whether to transfer its role of Inbound-Processor to another member for improved efficiency in handling the communication. For instance, this determination may include detecting whether the number of inbound packets transferred from a given member exceed a threshold amount (e.g., within a given time frame or as a percentage of the total number of inbound packets received so far, etc.). If the threshold is exceeded for a given member, then the Inbound-Processor may determine it is more efficient to transfer the role of Inbound-Processor to that given member.

If determined in block 702 that the role of Inbound-Processor should be transferred to another member (e.g., to a determined optimal member for improved efficiency), operation advances to block 703 whereat the role is transferred to such determined optimal member. In performing the transfer in certain embodiments, the Inbound-Processor may send the inbound IPsec SA for this non-member node communication to the determined optimal member (block 704) and update the Inbound Directory to reflect the role change (block 705).

As shown, in parallel with the Inbound-Processor monitoring whether to migrate its role to another member (operations 701-705), the Outbound-Processor similarly monitors whether to migrate its role to another member (in operations 706-710). For instance, in block 706 the Outbound-Processor monitors the frequency and source of outbound packets forwarded from other members. In block 707, the Outbound-Processor determines whether to transfer its role of Outbound-Processor to another member for improved efficiency in handling the communication. For instance, this determination may include detecting whether the number of outbound packets transferred from a given member exceed a threshold amount (e.g., within a given time frame or as a percentage of the total number of outbound packets sent so far, etc.). If the threshold is exceeded for a given member, then the Outbound-Processor may determine it is more efficient to transfer the role of Outbound-Processor to that given member.

If determined in block 707 that the role of Outbound-Processor should be transferred to another member (e.g., to a determined optimal member for improved efficiency), operation advances to block 708 whereat the role is transferred to such determined optimal member. In performing the transfer in certain embodiments, the Outbound-Processor may send the outbound IPsec SA for this non-member node communication to the determined optimal member (block 709), and the IKE-Negotiator updates the Outbound Directory to reflect the role change (block 710).

Typically with IPsec, the initial Inbound-Processor for a given Phase 2-Connection will likely remain the preferred member for satisfying this role unless there is a change in the proxy ARP location or external routing. When this change happens, all traffic for the connection should eventually enter the cluster through the new member. Therefore, a fairly simple rule can apply: if any member is forwarding a significant percentage of the packets being processed, migrate the Inbound-Processor role to that member. A reasonable threshold might be at 80% of total packets processed, for example. The migration condition should apply over two or three statistics collection intervals before triggering a migration in order to filter out transient routing changes, and there should be a minimum packet count to avoid migration when the total volume of packets is trivially small. The thresholds and intervals are preferably all tuneable.

In certain implementations, the location of the preferred Outbound-Processor depends on which cluster members are generating outbound traffic for the connection. This generation of outbound traffic depends on the type of services (single or multi-instance) that match the connection and the number of servers currently active. A single instance service is a service, such as a mail or web server, which only runs on one cluster member at a time. A multi-instance service is a service, such as a mail or web server, which can run on multiple cluster members at the same time. In certain embodiments, the IKE daemon is a multi-instance service. For multiple services or a multi-instance service the cluster members generating outbound traffic could change frequently. For a single-instance server, the cluster member generating outbound traffic might only change when the service is relocated. The following rule is applied in certain implementations: if any cluster member is tunneling a larger percentage of the total packets than are being generated locally, migrate the Outbound-Processor role to that member. A reasonable threshold might be at 20% greater than the local count, for example The migration condition should apply over a relatively large member of statistics sampling intervals before migrating, on the order of a few minutes total. This type of migration condition should filter out short sessions to multi-instance services. Again, a minimum packet count should be applied as well. The thresholds and intervals are preferably all tuneable.

With cluster aliases, an IKE daemon of certain embodiments will, at times, receive packets that should be processed on a different cluster member. Since IPsec and IKE state are not fully replicated in certain embodiments (such as those of FIGS. 3A-6 described above), the IKE daemon may be implemented to efficiently decide whether it should:

Forward an outbound packet to the Outbound-Processor, or start an IKE negotiation on behalf of the cluster;

Forward an inbound packet to the Inbound-Processor; or

Forward an inbound IKE packet to the IKE-Negotiator, handle the packet itself (if it is already the IKE-Negotiator), or start an IKE negotiation on behalf of the cluster.

To accomplish this efficient decision-making, three in-memory directories are maintained and kept synchronized across the aliased cluster in certain embodiments. These directories allow certain IPsec and IKE state to be located by all cluster members. In certain implementations, each cluster member has a copy of the directory contents. An example technique of implementing these directories in accordance with one embodiment is described further below.

In one example implementation, the in-memory database mechanism provides for a synchronized datastore, and one or more indices. Each of the directories has a primary index that maps from a directory-specific key to the internal identifier (record number) used to access an entry in the shared datastore. The index is maintained locally and updated in response to changes in the shared datastore.

In addition to its primary index based on the directory-specific key, in this example implementation, each directory contains a secondary index called the "recovery" index. This index is used on node death to locate all the directory entries that contain a reference to the failed (dead) member. One example structure is an array of trees, with one tree for each cluster member. Each leaf of the tree contains the internal identifier (record number) of a datastore record that references the cluster member. The tree structure allows the index to be updated easily as directory entries are added, removed, or modified.

A directory entry might reference more than one cluster member (e.g. the entry might specify the IKE-Negotiator and Outbound-Processor). The corresponding record number would therefore appear in multiple trees in the recovery index. Like the primary index, the recovery index is maintained locally on each member and updated in response to changes in the shared datastore in this example implementation.

With regard to the Outbound Directory, given a packet requiring IPsec protection, the Outbound Directory is used to determine which cluster member, if any, is the Outbound-Processor for the packet in at least one embodiment. In one example implementation, each entry in the directory corresponds to a Phase 2-Connection somewhere in the cluster, and contains at least the following information:

| Element | Description |
| --- | --- |
| Packet Selectors | {source address, destination address, protocol, source-port, destination-port} 5-tuple associated with the Phase 2-Connection. |
| SPD Connection ID | Identifier of the SPD-Connection that created the Phase 2-Connection. |
| Outbound-Processor | The cluster member ID of the Outbound-Processor. |
| IKE-Negotiator | The cluster member ID of the IKE-Negotiator for the Phase 2-Connection. | the packet selector data is represented in a special way in this example implementation of the Outbound Directory. It is possible, in this example, to represent "wildcard" values that accommodate the following cases:

If the SPD specifies a per-subnet connection, there will be a single entry (Phase 2-Connection) for each subnet. The packet selectors record the IP subnet as the source and destination address, and "any" for the protocol and port values;

If the SPD specifies a per-host connection, there will be separate entries (Phase 2-Connections) for each remote host. The packet selectors record the source and destination IP address associated with the connection, and "any" for the protocol and port values;

If the SPD specifies a per-protocol connection, there will be a separate entry for each remote host and protocol value. The packet selectors record the source and destination IP addresses, the protocol, and "any" for the port values; and If the SPD specifies a per-port connection, there will be a separate entry for each unique 5-tuple value. The packet selectors record the source and destination IP addresses, protocol, and source and destination port values.

Because of the desire to handle "wildcard" matches, the searching of this directory may be supported as follows: The Outbound Directory is accessed in response to a trigger packet. The trigger includes the number of the SPD-connection matched by the packet. By using the SPD-connection ID as part of the key into the directory, the ordering of the SPD-connections is taken into account. A two-level lookup is used in this example implementation. The key for an entry in the directory includes the ID of the SPD-connection matched by the outbound, plain-text packet; and the {src address, dest address, protocol, src port, dest port} 5-tuple of the outbound, plain-text packet.

The directory's primary index maps the SPD-connection ID to a list of datastore record numbers in this example implementation. Each datastore record (directory entry) in the list is then examined, and the packet selectors compared to those of the outbound packet. The comparison takes into account the "wildcard" values in the packet selectors. If a matching directory entry is found, then a Phase-2 Connection exists for the packet, and the Outbound-Processor and IKE-Negotiator are given by the entry. If no match is found, the searching node will begin a new IKE negotiation.

With regard to the Inbound Directory, given an incoming IPsec protected packet, the Inbound Directory is used to determine which cluster member, if any, is the Inbound-Processor for the packet in accordance with at least one embodiment. In one example implementation, each entry in the Inbound Directory corresponds to a Phase 2-Connection somewhere in the cluster, and contains at least the following information:

| Element | Description |
| --- | --- |
| SPI | The SPI of the SA negotiated for the Phase 2-Connection. If the connection creates an SA bundle, the SPI of the outermost SA. |
| SPD Connection ID | Identifier of the SPD-Connection that created the Phase 2-Connection. |
| Inbound-Processor | The cluster member ID of the Inbound-Processor. |
| IKE-Negotiator | The cluster member ID of the IKE-Negotiator for the Phase 2-Connection. |

The key used to search this directory is an SPI value, obtained from the outermost IPsec protocol header of the inbound packet in this example implementation. The directory's primary index maps from an SPI value to a datastore record number. The corresponding datastore record (directory entry) identifies the Inbound-Processor and IKE-Negotiator associated with that SPI. SPI values are unique cluster-wide.

With regard to the IKE Directory, given the source and destination IP address of an incoming IKE packet, the IKE Directory is used to determine which cluster member, if any, is the IKE-Negotiator that should process the packet in accordance with at least one embodiment. In one example implementation, each entry in the IKE Directory corresponds to an IKE Connection somewhere in the cluster. In this example implementation, each entry contains at least the following information:

| Element | Description |
| --- | --- |
| IKE Packet Addresses | The IP source and destination address of the IKE packets for this IKE Connection. |
| SPD Connection ID | Identifier of the SPD-Connection associated with the IKE Connection. |
| IKE-Negotiator | The cluster member ID of the member responsible for the IKE Connection. |
| Reference Count | Count of the number of Inbound-Directory or Outbound-Directory entries that reference this IKE Connection. |

The key used to search this directory is a combined IP source and destination address, obtained from the incoming IKE packet in this example implementation. The directory's primary index maps from the address pair to a datastore record number. The corresponding datastore record (directory entry) identifies the IKE-Negotiator for the packet.

While specific example implementations of the IKE, Inbound, and Outbound Directories are described above, embodiments are not limited to those example implementations, but rather various other techniques for implementing such information to be visible cluster-wide may be utilized.

When implemented via computer-executable instructions, various elements of embodiments described herein for providing an aliased cluster capable of supporting secured communication (e.g., IPsec secured communication) with a client are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

FIG. 8 illustrates an example computer system 800 adapted according to an embodiment for implementing a member of such an aliased cluster. That is, computer system 800 may be a computer system forming a given member of a cluster on which an IKE daemon process and IPsec engine is to run as described above. Of course, embodiments are not limited in application solely to the example computer system 800 of FIG. 8, but instead various other types of processor-based systems may form a member of an aliased cluster.

In the example computer system 800, central processing unit (CPU) 801 is coupled to system bus 802. CPU 801 may be any general purpose CPU. CPU 801 may execute the various logical instructions according to embodiments described herein. For example, CPU 801 may execute machine-level instructions according to the exemplary operational flows of a member of an aliased cluster as described above.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 may hold user and system data and programs, including IKE daemon, IPsec engine, SAs, and at least a portion of distributed databases implementing an IKE Directory, Inbound Directory, and Outbound Directory, as described above.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information thereto.

I/O adapter 805 preferably connects storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for application programs. RAM 803, ROM 804, and/or storage devices 806 may be used for storing data for one or more of an IKE Directory, Inbound Directory, and Outbound Directory, as examples, in accordance with the embodiments described above. Communications adapter 811 is preferably adapted to couple computer system 800 to network 812, such as network 12 described in the above example embodiments.

User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810.

It shall be appreciated that the embodiments of implementing an aliased cluster for supporting secured communication as described herein are not limited to the architecture of system 800. For example, any suitable processor-based device may be utilized for implementing a cluster member, including without limitation personal computers, laptop computers, computer workstations, etc.

What is claimed is:

1. A method comprising:
   implementing cluster aliasing for a cluster of a plurality of computer-based members; and
   supporting, by the aliased cluster, secured communication with a non-member node, wherein the cluster aliasing provides an appearance to said non-member node of a common network address for the plurality of members, and wherein said supporting the secured communication comprises:
   assigning a first of the plurality of members to process secure inbound data directed to the common network address from the non-member node; and
   assigning a second, different of the plurality of members to send secure outbound data from the common network address to the non-member node.

2. The method of claim 1 wherein said supporting the secured communication comprises:
   supporting communication secured by communication protocol level security.

3. The method of claim 1 wherein said supporting the secured communication comprises:
   supporting Internet Protocol security (IPsec) secured communication.

4. The method of claim 1 further comprising:
   interfacing each of said plurality of members to a communication network over which said secured communication with said non-member node is conducted.

5. A method comprising:
   implementing cluster aliasing for a cluster of a plurality of computer-based members; and
   using distributed processing among the plurality of members for supporting secured communication with a non-member node, wherein the cluster aliasing provides an appearance to said non-member node of a common network address for the plurality of members, and wherein using distributed processing among the plurality of members for supporting the secured communication comprises:
   assigning a first of the plurality of members to process secure inbound data directed to the common network address from the non-member node;
   assigning a second, different of the plurality of members to send secure outbound data from the common network address to the non-member node; and
   assigning a third, different of the members to negotiate a security association for the secured communication using the common network address.

6. The method of claim 5 further comprising:
   making information associated with the secured communication visible cluster-wide.

7. A method comprising:
   implementing cluster aliasing for a cluster of a plurality of computer-based members, wherein the cluster appearance to a non-member node of a common network address for the plurality of members;
   performing, by the aliased cluster, negotiation of security for a secured communication using the common network address with said non-member node, wherein the negotiation is performed by a first of the plurality of members; and
   processing secure inbound data addressed to the common network address by a second, different one of the plurality of members.

8. The method of claim 7 wherein said performing negotiation comprises:
   receiving at a third member of said cluster a first negotiation packet from said non-member node.

9. The method of claim 8 wherein said first negotiation packet comprises a first Internet Key Exchange (IKE) message.

10. The method of claim 8 comprising:
sending, from said non-member node, said first negotiation packet to the common network address of said aliased cluster.

11. The method of claim 8 further comprising:
said third member accessing a directory that is visible cluster-wide; and
said third member determining from said directory whether another member has claimed responsibility for performing this negotiation of security with said non-member node.

12. The method of claim 11 further comprising:
if determined that the first member has claimed responsibility for performing this negotiation of security with said non-member node, said third member forwarding the received first negotiation packet to said member; and
if determined that no other member has claimed responsibility for performing this negotiation of security with said non-member node, said third member claiming said responsibility and creating an entry in said directory identifying that said third member claims said responsibility.

13. The method of claim 12 further comprising:
the first member having claimed said responsibility processing the received first negotiation packet and sends a response to said non-member node.

14. The method of claim 12 further comprising:
until security negotiation with said non-member node is complete, received negotiation packets for this security negotiation are forwarded within the aliased cluster to the first member having claimed said responsibility.

15. The method of claim 14 further comprising:
when said security negotiation with said non-member node is complete, the first member having claimed said responsibility creating at least one security association (SA) for use in supporting the secured communication with said non-member node.

16. The method of claim 15 wherein said creating at least one SA further comprises:
said first member having claimed said responsibility creating a security negotiation association.

17. The method of claim 16 wherein said security negotiation association is used for dynamically varying security keys for the secured communication.

18. The method of claim 17 wherein said security keys comprise encryption and decryption keys.

19. The method of claim 16 wherein said security negotiation association comprises an Internet Key Exchange (IKE) Security Association (SA).

20. A method comprising:
implementing cluster aliasing to generate an aliased network address for a cluster of a plurality of computer-based members; and
supporting, by the aliased cluster, secured communication with a non-member node, wherein said supporting includes
(a) creating an inbound Security Association (SA) for use in processing, by a first one of the plurality of members, secured data addressed to the aliased network address received from said non-member node and
(b) creating an outbound SA for use in securing data to be sent, by a second, different one of the plurality of members, from the aliased network address to said non-member node.

21. The method of claim 20 wherein said secured communication comprises Internet Protocol security (IPsec) secured communication.

22. The method of claim 20 further comprising:
assigning said inbound SA to the first member of said cluster, and
assigning said outbound SA to the second member of said cluster.

23. The method of claim 22 further comprising:
publishing to the cluster the identity of said first member to whom said inbound SA is assigned; and
publishing to the cluster the identity of said second member to whom said outbound SA is assigned.

24. The method of claim 23 wherein said publishing comprises creating an entry in at least one, directory that is visible cluster-wide.

25. Computer-executable software code stored to a computer-readable storage device, said computer-executable software code comprising:
code for supporting secured communication between an aliased cluster having a plurality of members and a non-member node, wherein the aliased cluster is associated with an aliased network address, wherein said code for supporting includes
(a) code for assigning to a first member of the aliased cluster a role of Inbound-Processor for the secured communication involving the aliased network address,
(b) code for assigning to a second, different member of the aliased cluster a role of Outbound-Processor for the secured communication involving the aliased network address,
(c) code for publishing to the cluster the identity of said Inbound-Processor member for the secured communication, and
(d) code for publishing to the cluster the identity of said Outbound-Processor member for the secured communication.

26. The computer-executable software code of claim 25 further comprising:
code executable upon a given member other than the Inbound-Processor member receiving a packet of the secured communication from said non-member node for forwarding the received packet within the cluster to the Inbound-Processor member.

27. The computer-executable software code of claim 26 further comprising:
code executable for monitoring the amount of packets forwarded to said Inbound-Processor member from another member; and
code executable for determining, based at least in part on said monitored amount of forwarded packets, whether to transfer the role of Inbound-Processor to another member.

28. The computer-executable software code of claim 25 further comprising:
code executable upon a given member other than the Outbound-Processor member having a response to be sent in the secured communication to said non-member node for forwarding the response within the cluster to the Outbound-Processor member.

29. The computer-executable software code of claim 28 further comprising:
code executable for monitoring an amount of responses forwarded to said Outbound-Processor member from another member, and code executable for determining, based at least in part on said monitored amount of forwarded responses, whether to transfer the role of Outbound-Processor to another member.

30. A system comprising:
an aliased cluster having a plurality of processor-based devices as members, wherein said aliased cluster supports communication protocol level secured communication with a non-member node, and wherein the aliased cluster is associated with a common network address,
wherein a first of the plurality of members is assigned to process secure inbound data sent to the common network address from the non-member node, and
wherein a second, different of the plurality of members is assigned to send secure outbound data from the common network address to the non-member node.

31. The system of claim 30 wherein said communication protocol level secured communication is Internet Protocol security (IPsec) secured communication.

32. The system of claim 30 wherein said aliased cluster is communicatively coupled to a communication network.

33. The system of claim 32 wherein said plurality of members each have an interface to said communication network.

34. The system of claim 30 wherein said aliased cluster is operable to dynamically transfer roles of processing secure inbound data and sending secure outbound data to other members within the aliased cluster during a given secured communication session.

35. The system of claim 34 wherein said aliased cluster dynamically transfers the role of processing secure inbound data to a member within the aliased cluster that provides optimal efficiency for inbound processing for said given secured communication session, and wherein said aliased cluster dynamically transfers the role of sending secure outbound data to a member within the aliased cluster that provides optimal efficiency for outbound processing for said given secured communication session.

36. The system of claim 35 wherein said optimal efficiency minimizes an amount of forwarding of packets of the given secured communication session within the aliased cluster.

37. The system of claim 30 further comprising:
an inbound directory that is accessible to all members of the aliased cluster and that identifies for a given secured communication session a member assigned to process secure inbound data.

38. The system of claim 30 further comprising:
an outbound directory that is accessible to all members of the aliased cluster and that identifies for a given secured communication session a member assigned to send secure outbound data.

39. The system of claim 30 further comprising:
an Internet Key Exchange (IKE) directory that is accessible to all members of the aliased cluster and that identifies for a given secured communication session a member assigned as IKE-Negotiator.

40. A method of supporting Internet Protocol security (IPsec) secured communication by an aliased cluster, the method comprising:
assigning, for a given IPsec secured communication session with a node that is not a member of said cluster, a role of Inbound-Processor to a first member of the aliased cluster for processing secure inbound data addressed to an aliased network address of the aliased cluster;
assigning, for the given IPsec secured communication session, a role of Outbound-Processor to a second different member of the aliased cluster to send secure outbound data from the aliased network address;
publishing the identity of the first member assigned the role of Inbound-Processor in a directory that is accessible by all members of the aliased cluster; and
publishing the identity of the second member assigned the role of Outbound-Processor in a directory that is accessible by all members of the aliased cluster.

41. The method of claim 40 further comprising:
upon a given member other than the first member assigned the role of Inbound-Processor receiving an inbound IPsec secured packet from the non-member node, the given member forwarding the received inbound IPsec secured packet within the aliased cluster to the first member assigned the role of Inbound-Processor.

42. The method of claim 41 further comprising:
the given member determining the first member assigned the role of Inbound-Processor from the published identity of the first member assigned the role of Inbound-Processor.

43. The method of claim 41 further comprising:
monitoring an amount of forwarding of inbound IPsec protected packets within the cluster from other members to the first member assigned the role of Inbound-Processor; and
determining whether efficiency of the cluster in supporting the IPsec secured communication would be improved by transferring the role of Inbound-Processor to another member in the aliased cluster.

44. The method of claim 43 further comprising:
if determined that said efficiency would be improved, transferring the role of Inbound-Processor to another member of the aliased cluster.

45. The method of claim 40 further comprising:
upon a given member other than the second member assigned the role of Outbound-Processor receiving an outbound response to the non-member node, the given member forwarding the outbound response within the aliased cluster to the second member assigned the role of Outbound-Processor.

46. The method of claim 45 further comprising:
the given member determining the second member assigned the role of Outbound-Processor from the published identity of the second member assigned the role of Outbound-Processor.

47. The method of claim 45 further comprising:
monitoring the amount of forwarding of outbound responses within the cluster from other members to the second member assigned the role of Outbound-Processor, and
determining whether efficiency of the cluster in supporting the IPsec secured communication would be improved by transferring the role of Outbound-Processor to another member.

48. The method of claim 47 further comprising:
if determined that said efficiency would be improved, transferring the role of Outbound-Processor to another member of the aliased cluster.

49. The method of claim 1, further comprising:
a third of the plurality of members receiving the secure inbound data that is part of the secured communication from the non-member node;

accessing, by the third member, cluster-wide information to identify which of the plurality of members is responsible for inbound processing of the secure inbound data; and in response to the identifying, forwarding the secure inbound data from the third member to the first member to process the inbound data.

50. The method of claim 1, further comprising:
the first member decrypting the inbound data that is part of the secured communication using an inbound security association; and
the second member encrypting the outbound data that is part of the secured communication using an outbound security association.

51. The method of claim 1, further comprising migrating a role of processing secure inbound data from the first member to a third member of the aliased cluster in response to determining that the third member receives more secure inbound data than the first member.

52. The method of claim 5, further comprising migrating a role of sending secure outbound data from the second member to another member of the aliased cluster in response to determining that the another member has more secure outbound data to send than the second member.

53. The method of claim 7, further comprising:
sending, by a third, different one of the plurality of members, secure outbound data from the common network address.

54. The system of claim 30, wherein the secure inbound data and secure outbound data are part of the secured communication with the non-member node.

55. The system of claim 30, wherein the first member processes the inbound data using an inbound security association, and the second member protects the outbound data using an outbound security association.

56. The method of claim 40, wherein the first member processes the secure inbound data according to an inbound security association, and wherein the second member sends the secure outbound data protected according to the outbound security association.

* * * * *

UNITED STATES PATENT AND TRADEMARK OFFICE
CERTIFICATE OF CORRECTION

| | | |
|---|---|---|
| PATENT NO. | : 8,364,948 B2 | Page 1 of 1 |
| APPLICATION NO. | : 11/013197 | |
| DATED | : January 29, 2013 | |
| INVENTOR(S) | : Grebus et al. | |

It is certified that error appears in the above-identified patent and that said Letters Patent is hereby corrected as shown below:

In the Claims

Column 26, lines 49-50, in Claim 7, delete "cluster appearance" and insert -- cluster aliasing provides an appearance --, therefor.

Column 28, line 6, in Claim 22, delete "cluster," and insert -- cluster; --, therefor.

Column 28, line 15, in Claim 24, delete "one," and insert -- one --, therefor.

Column 28, line 67, in Claim 29, delete "member," and insert -- member; --, therefor.

Column 30, line 2, in Claim 40, delete "second" and insert -- second, --, therefor.

Column 30, lines 53-54, in Claim 47, delete "Outbound-Processor," and insert -- Outbound-Processor; --, therefor.

Signed and Sealed this
Twenty-second Day of October, 2013

Teresa Stanek Rea
*Deputy Director of the United States Patent and Trademark Office*